United States Patent
Irube et al.

(10) Patent No.: US 6,377,818 B2
(45) Date of Patent: *Apr. 23, 2002

(54) COMMUNICATION TERMINAL APPARATUS

(75) Inventors: Akira Irube, Yokohama; Shigenobu Minami, Ayase; Osamu Yamagishi, Tokyo, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,180

(22) PCT Filed: Mar. 3, 1998

(86) PCT No.: PCT/JP98/00874

§ 371 Date: Nov. 2, 1998

§ 102(e) Date: Nov. 2, 1998

(87) PCT Pub. No.: WO98/39906

PCT Pub. Date: Sep. 11, 1998

(30) Foreign Application Priority Data

Mar. 3, 1997 (JP) .............................................. 9-048127
Jul. 2, 1997 (JP) ............................................. 9-177198

(51) Int. Cl.[7] .............................. H04B 1/38; H04N 7/14

(52) U.S. Cl. ........................ 455/556; 455/568; 455/569; 348/14.01; 348/14.02

(58) Field of Search ......................... 348/14, 17, 14.15, 348/14.01, 14.02; 455/550, 556, 557, 566, 73, 74, 575, 90, 899, 11.1; 379/419, 428, 433, 434, 447, 202–205, 93.21

(56) References Cited

U.S. PATENT DOCUMENTS

| | | | | |
|---|---|---|---|---|
| 5,191,602 A | * | 3/1993 | Regen et al. | 455/568 |
| 5,481,605 A | * | 1/1996 | Sakurai et al. | 379/243 |
| 5,493,609 A | * | 2/1996 | Winseck, Jr. et al. | 348/17 X |
| 5,517,552 A | * | 5/1996 | Yamashita | 456/556 |
| 5,533,097 A | * | 7/1996 | Crane et al. | 455/556 |

(List continued on next page.)

FOREIGN PATENT DOCUMENTS

| | | |
|---|---|---|
| JP | 2-26170 | 1/1990 |
| JP | 3-85980 | 4/1991 |
| JP | 7-46556 | 2/1995 |
| JP | 7-201256 | 8/1995 |
| JP | 7-231355 | 8/1995 |
| JP | 7-101899 | 11/1995 |
| JP | 7-336462 | 12/1995 |
| JP | 8-79361 | 3/1996 |
| JP | 8-321869 | 12/1996 |
| JP | 9-65436 | 3/1997 |
| JP | 9-83981 | 3/1997 |

*Primary Examiner*—Tracy Legree
(74) *Attorney, Agent, or Firm*—Finnegan, Henderson, Farabow, Garrett, & Dunner, L.L.P.

(57) ABSTRACT

A communication terminal apparatus is separated into a housing that is capable of video/voice communications, and a housing that is capable of only voice communications. Since functions of the housing that is capable of only the voice communications are limited, the housing becomes small, can be stored in a pocket or the like, and can immediately go off-hook upon reception of an incoming call. Upon reception of a videophone communication request, the user goes off-hook using the housing that is capable of only the voice communications to immediately make voice communications with the partner terminal, and can switch the communication mode to the video/voice communications using the housing that is capable of the video/voice communications, as needed. Hence, even a communication terminal having a videophone function can comprise a video input/output function without impairing its portability and storability.

12 Claims, 21 Drawing Sheets

U.S. PATENT DOCUMENTS

| | | | | |
|---|---|---|---|---|
| 5,550,754 A | * | 8/1996 | McNelley et al. | 348/13 X |
| 5,559,860 A | * | 9/1996 | Mizikovsky | 455/412 |
| 5,572,442 A | * | 11/1996 | Schulhof et al. | 455/3.04 |
| 5,625,673 A | * | 4/1997 | Grewe et al. | 455/556 |
| 5,760,824 A | * | 6/1998 | Hicks, III | 348/14 |
| 5,771,438 A | * | 6/1998 | Palermo et al. | 455/568 |
| 5,793,416 A | * | 8/1998 | Rostoker et al. | 348/17 |
| 5,892,537 A | * | 4/1999 | Georges et al. | 348/14 |
| 5,892,794 A | * | 4/1999 | Slegers | 455/557 X |
| 5,913,163 A | * | 6/1999 | Johansson | 455/575 X |
| 5,943,627 A | * | 8/1999 | Kim et al. | 455/569 |
| 5,966,164 A | * | 10/1999 | Gotoh et al. | 348/14 |
| 6,078,825 A | * | 6/2000 | Hahn et al. | 455/569 |
| 6,230,029 B1 | * | 5/2001 | Hahn et al. | 455/568 |

* cited by examiner

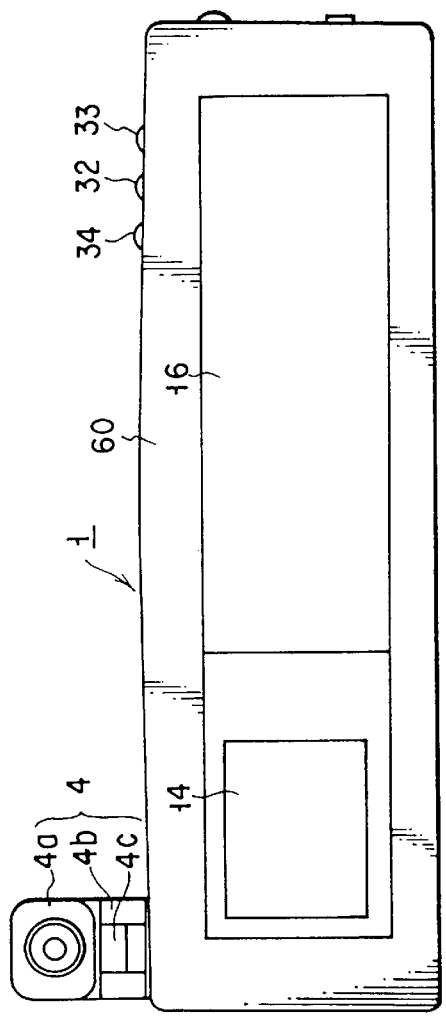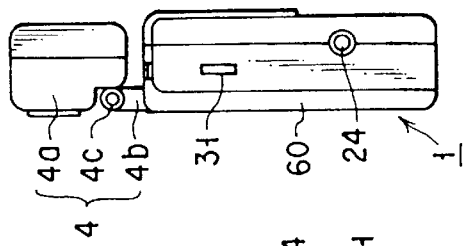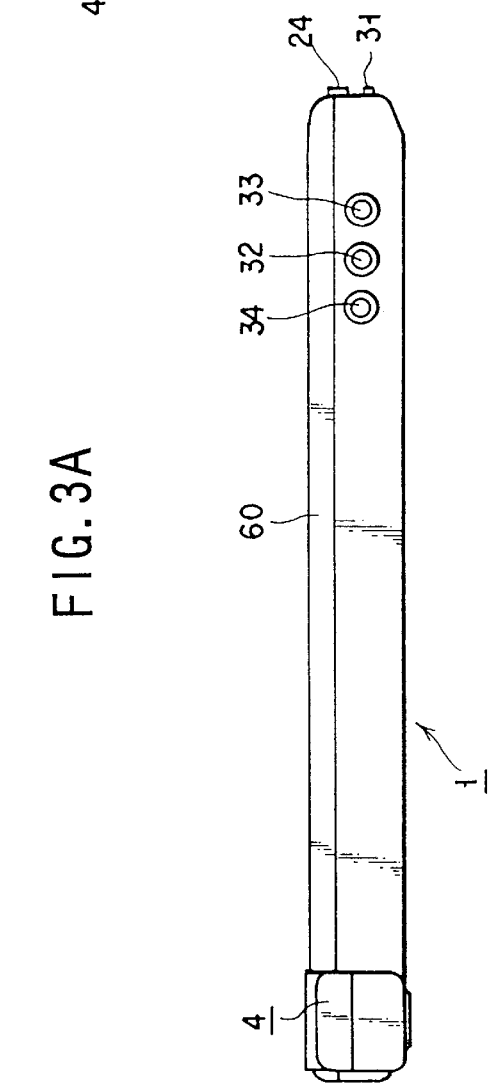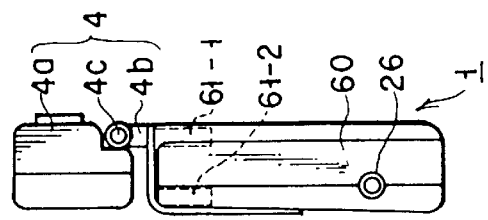

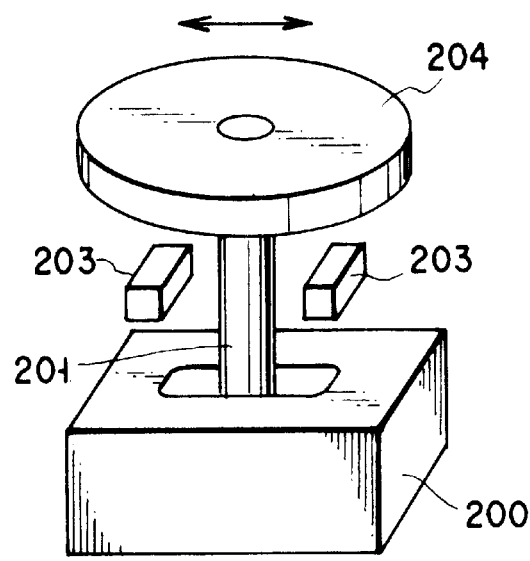
FIG. 5
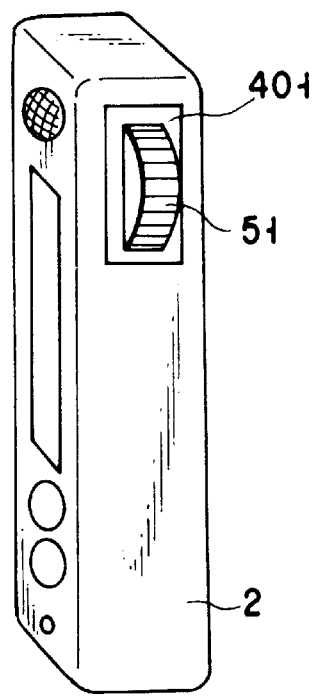
HANDSET SIDE SURFACE
FIG. 6
| RIGHT CONTACT | ON | OFF |
|---|---|---|
| CLOCKWISE | ↓ | ↑ |
| COUNTER-CLOCKWISE | ↑ | ↓ |
FIG. 7

COMMUNICATION TERMINAL APPARATUS

TECHNICAL FIELD

The present invention relates to a communication terminal apparatus combined with a handset with high portability.

BACKGROUND ART

When a so-called videophone function or the like is to be equipped in a communication terminal apparatus such as a PHS (Personal Handyphone System), portable terminal (cordless telephone), or the like that uses radio waves, a camera and display device are required, and its housing inevitably becomes larger than a terminal with a telephone function alone. For this reason, a radio communication terminal with a videophone function has poor portability and storability, and is not easy to use.

DISCLOSURE OF THE INVENTION

The present invention has been made in consideration of the above situation, and has as its object to provide a communication terminal apparatus whose portability and storability do not deteriorate even when it has a videophone function or the like.

According to the present invention, a communication terminal system in which one communication terminal is constructed by at least first and second housings, is characterized in that the first housing comprises radio communication means for making a communication with another communication terminal by radio, and first communication means for making a communication with a housing other than the first housing, the second housing comprises second communication means for making a communication with a housing other than the second housing, and the first housing can make a video communication including at least a moving image and/or still image with another communication terminal, the second housing can make at least a voice communication with the other communication terminal, or the first housing can make at least a voice communication with another communication terminal, and the second housing can make a video communication including at least the moving image and/or still image with another terminal.

With this communication terminal system, the housing that is capable of voice communications alone is small by limiting its functions, and can be stored in, e.g., a pocket. Also, upon reception of an incoming call, this housing allows the user to immediately go off-hook. Even upon reception of a videophone communication request, the user goes off-hook using the housing that is capable of voice communications alone, and can switch the communication mode to a video/voice communication mode using the housing that is capable of video/voice communications. Hence, even a communication terminal having a videophone function can comprise a video input/output function without impairing its portability and storability.

According to the present invention, a communication terminal apparatus comprises display means for displaying information, scroll direction input means for inputting a scroll direction of information to be displayed on the display means, operation direction detection means for detecting an operation direction of the screen scroll direction input means, and display control means for, when the operation direction is a first operation direction and the information scroll direction is a first screen scroll direction, making a display in a first order, when the operation direction is the first operation direction and the information scroll direction is a second screen scroll direction, making a display in a second order, when the operation direction is a second operation direction and the information scroll direction is the first screen scroll direction, making a display in the first order, and when the operation direction is the second operation direction and the information scroll direction is the second screen scroll direction, making a display in the second order.

According to this communication terminal apparatus, the operation direction detection means can detect whether the screen scroll direction input means is operated from, e.g., right or left direction, and the display control means can scroll the screen in correspondence with the detected operation direction. For this reason, even when the user operates the terminal apparatus while holding it with a hand, very easy operation is assured.

According to the present invention, a video communication system constructed by interconnecting a video transmission terminal having at least one video input means and video transmission means, and a video reception terminal having at least one video display means and video reception means via a radio communication network or wired communication network, comprises terminal holding direction detection means for detecting a holding direction of the video reception terminal, sending means for sending information indicating the holding direction of the video reception terminal detected by the terminal holding direction detection means to the video transmission terminal, and processing means for processing a video to be transmitted by the video transmission means on the basis of the holding direction information of the video transmission terminal sent from the sending means.

According to this video communication system, the terminal holding direction detection means detects the holding state of the terminal, and the detected holding state is exchanged between terminals via the communication means. Based on a comparison result of the exchanged holding state information by the comparison means, if the directions of the two terminals do not agree with each other, the processing means processes the displayed image to match the video display directions. Hence, even when the terminal holding directions of the users do not match at the transmitting and receiving sides, images displayed on the two terminals can be prevented from horizontally or vertically inverted.

BRIEF DESCRIPTION OF DRAWINGS

FIG. 3 is a view showing the outer appearance of a terminal main body and camera unit;

FIG. 5 is a view showing a mechanism for detecting stress;

FIG. 6 is a view showing another example of the arrangement of a stress direction sensor of a scroll dial;

FIG. 7 is a table showing the detection method of operation directions on the basis of an output (ON or OFF) from a skin contact sensor;

BEST MODE OF CARRYING OUT THE INVENTION

First Embodiment

Figure 1:
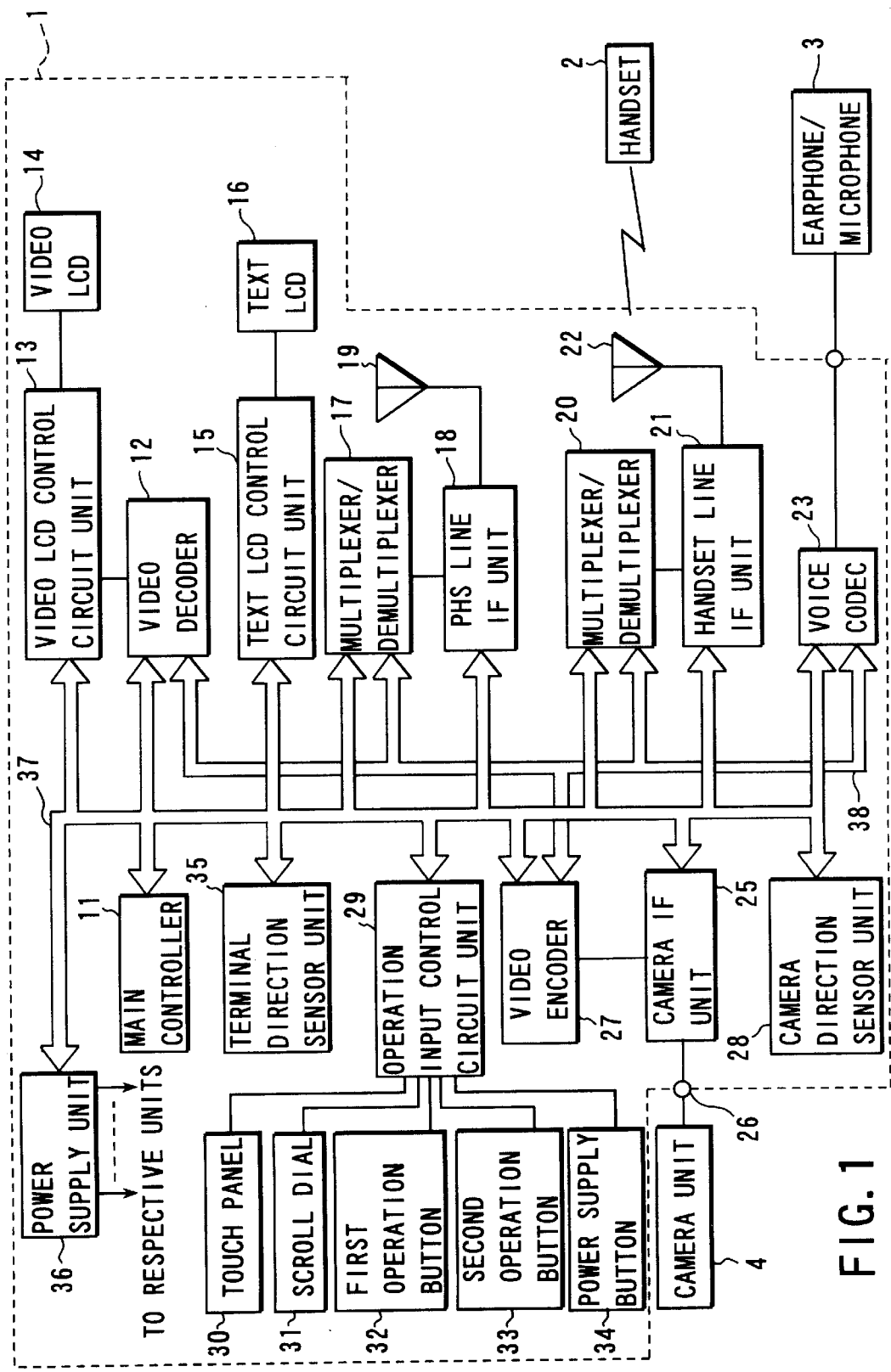
FIG. 1 is a block diagram showing the arrangement of principal part of a communication terminal apparatus according to the first embodiment of the present invention.

FIG. 1 is a block diagram showing the arrangement of principal part of a communication terminal apparatus according to the first embodiment of the present invention.

In FIG. 1, reference numeral 1 denotes a terminal main body, which has a main controller 11, video decoder 12, video LCD control circuit unit 13, video LCD 14, text LCD control circuit unit 15, text LCD 16, multiplexer/demultiplexer 17, PHS line interface unit (PHS line I/F unit) 18, antenna 19, multiplexer/demultiplexer 20, handset line interface unit (handset line I/F unit) 21, antenna 22, voice codec 23, earphone/microphone terminal 24, camera interface unit (camera I/F unit) 25, camera terminal 26, video encoder 27, camera direction sensor unit 28, operation input control circuit unit 29, touch panel 30, scroll dial 31, first operation button 32, second operation button 33, power supply button 34, terminal direction sensor unit 35, and power supply unit 36. Of these units, the main controller 11, video decoder 12, video LCD control circuit unit 13, text LCD control circuit unit 15, multiplexer/demultiplexer 17, PHS line interface unit 18, multiplexer/demultiplexer 20, handset line interface unit 21, voice codec 23, camera interface unit 25, video encoder 27, camera direction sensor unit 28, operation input control circuit unit 29, terminal direction sensor unit 35, and power supply unit 36 are connected to each other via a main bus 37. The video decoder 12, multiplexer/demultiplexer 17, multiplexer/demultiplexer 20, voice codec 23, and video encoder 27 are connected to each other via a synchronization bus 38.

The main controller 11 has a CPU, ROM,. RAM, and the like, and systematically controls the respective units of the terminal main body 1, thus realizing operations of the communication terminal apparatus. The main controller 11 implements processing means for implementing various functions (to be described later) by software processing.

The video decoder 12 decodes encoded video data, and supplies the decoded video data to the video LCD control circuit unit 13. The video LCD control circuit unit 13 controls the video LCD 14 to display a video represented by video data supplied from the video decoder 12. The video LCD 14 comprises a color LCD having a resolution high enough to display a video complying with, e.g., MPEG4, ITU-T recommendation H.263, or the like, and displays a video under the control of the video LCD control circuit unit 13.

The text LCD control circuit unit 15 controls the text LCD 16 to display a text image represented by text data sent from the main controller 11. The text LCD 16 is a monochrome LCD which is larger and has a lower resolution than the video LCD 14, and displays a text image under the control of the text LCD control circuit unit 15.

The multiplexer/demultiplexer 17 has three operation modes including a multimedia communication mode, voice conversation mode, and data communication mode, and operates in the mode designated by the main controller 11.

In the multimedia communication mode, the multiplexer/demultiplexer 17 multiplexes encoded video data sent from the video encoder 27 via the synchronization bus 38, encoded voice data sent from the voice codec 23 via the synchronization bus 38, and other data supplied from the main controller 11 by a predetermined multiplex scheme (e.g., ITU-T recommendation H.221 or H.223, or their modifications), and supplies transmission data obtained as a result of multiplexing to the PHS line interface unit 18. Also, in the multimedia communication mode, the multiplexer/demultiplexer 17 demultiplexes encoded video data, encoded voice data, and other data from transmission data supplied from the PHS line interface unit 18, and supplies these data to the video:decoder 12, voice codec 23, and main controller 11, respectively.

In the voice conversation mode, the multiplexer/demultiplexer 17 directly supplies encoded voice data sent from the voice codec 23 via the synchronization bus 38 to the PHS line interface unit 18. Also, in the voice conversation mode, the multiplexer/demultiplexer 17 directly supplies transmission data (encoded voice data) sent from the PHS line interface unit. 18 to the voice codec 23. The PHS line interface unit 18 can be connected to a PHS (Personal Handyphone System) network by radio via the antenna 19, and performs various kinds of call processing to make communications via the PHS network. Also, the PHS line interface unit 18 exchanges transmission data via a communication path set via the PHS network.

In the data communication mode, the multiplexer/demultiplexer 17 supplies transmission data sent from the main controller 11 via the synchronization bus 38 to the PHS line interface unit 18, thus transmitting that data to a partner terminal. On the other hand, the multiplexer/demultiplexer 17 can receive transmission data sent from the partner terminal via the PHS line interface unit 18. The PHS line interface unit 18 can be connected to the PHS network by radio via the antenna 19, and performs various kinds of call processing to make communications via the PHS network. Also, the PHS line interface unit 18 exchanges transmission data via a communication path set via the PHS network.

The multiplexer/demultiplexer 20 multiplexes encoded voice data supplied from the voice codec 23 via the synchronization bus 38, and other data supplied from the main controller 11 via the main bus 37 by a predetermined multiplex scheme, and supplies transmission data obtained as a result of multiplexing to the handset line interface unit 21. Also, the multiplexer/demultiplexer 20 demultiplexes encoded voice data and other data from transmission data sent from the handset line interface unit 21, and supplies these data to the voice codec 23 and main controller 11, respectively. The handset line interface unit 21 exchanges transmission data with a handset 2 by radio via the antenna 22. Note that the radio channel between the terminal main body 1 and handset 2 (to be referred to as a handset channel hereinafter) uses, e.g., specific low-power radio. The multiplex scheme of transmission data exchanged via the handset channel may be a unique one, and may use simple time-division multiplex, ITU-T recommendation H.221 or H.223, or their modifications.

The voice codec 23 has two operation modes, i.e., a multimedia communication mode and voice conversation mode, and operates in the mode designated by the main controller 11. In the multimedia communication mode, the voice codec 23 converts a voice signal output from an earphone/microphone 3 connected via the earphone/microphone terminal 24 into a digital signal, and encodes the digital signal by a predetermined low-rate voice encoding scheme (e.g., ITU-T recommendation G729) to obtain encoded voice data. The voice codec 23 supplies this encoded voice data to the multiplexer/demultiplexer 17 via the synchronization bus 38. Also, in the multimedia communication mode, the voice codec 23 decodes a low-rate voice code in encoded voice data supplied from the multiplexer/demultiplexer 17, and converts the decoded code into an analog signal to obtain a voice signal. The voice codec 23 supplies the voice signal to the earphone/microphone 3. By contrast, in the voice conversation mode, the voice codec 23 converts a voice signal output from the earphone/microphone 3 connected via the earphone/microphone terminal 24 into a digital signal, and encodes the digital signal by 32-kbps ADPCM (ITU-T recommendation G721) to obtain encoded voice data. The voice codec 23 supplies this encoded voice data to the multiplexer/demultiplexer 17 via the synchronization bus 38. Also, in the voice conversation mode, the voice codec 23 decodes an ADPCM code in encoded voice data supplied from the multiplexer/demultiplexer 17, and converts the decoded code into an analog signal to obtain a voice signal. The voice codec 23 supplies this voice signal to the earphone/microphone 3. Note that the earphone/microphone 3 converts a voice spoken nearby into a voice signal and supplies it to the voice codec 23, and also outputs a voice signal supplied from the voice codec 23 as a voice. The earphone/microphone 3 is detachable from the terminal main body 1.

The camera interface unit 25 captures a video signal output from a camera unit 4 connected via the camera terminal 26, and converts it into a digital signal to obtain video data. The camera interface unit 25 supplies the video data to the video encoder 27. The video encoder 27 encodes the video data supplied from the camera interface unit 25 to obtain encoded video data based on MPEG4, ITU-T recommendation H.263, or their modified schemes. The video encoder 27 supplies the encoded video data to the video decoder 12 and multiplexer/demultiplexer 17. Note that the camera unit 4 uses a CCD camera or the like. This camera unit 4 is detachable from the terminal main body 1. In addition, the camera unit 4 can be attached in two states, i.e., a state wherein the unit 4 senses in the same direction as the side of the display surfaces of the video LCD 14 and text LCD 16, and a state wherein the unit 4 senses in the direction of the back side opposite to the side of the display surfaces of the video LCD 14 and text LCD 16. The camera direction sensor unit 28 detects the presence/absence of the attached camera unit 4, and in which of the two states the camera unit 4 is attached.

The operation input control circuit unit 29 is connected with the touch panel 30, scroll dial 31, first operation button 32, second operation button 33, and power supply button 34. The operation input control circuit unit 29 accepts user's instruction operations at these touch panel 30, scroll dial 31, first operation button 32, second operation button 33, and power supply button 34, and informs the main controller 11 of the contents of these instruction operations. The touch panel 30 is overlaid on the display surface of the text LCD 16, and receives various inputs corresponding to the display contents of the text LCD 16. The scroll dial 31 accepts a cursor movement instruction, display screen instruction, and the like. The first operation button 32 and second operation button 33 accept inputs of a determination instruction, cancel instruction, and the like. The power supply button 34 accepts an ON/OFF instruction of operation of the terminal main body 1.

The terminal direction sensor unit 35 is comprised of, e.g., a mercury switch and the like, and detects the direction of the terminal main body 1.

The power supply unit 36 has, e.g., a battery as a power supply, and supplies electric power to the respective units of the terminal main body 1. The power supply unit 36 turns power supply to the respective units on/off under the control of the main controller 11. However, the power supply unit 36 always supplies electric power to at least the main controller 11 and operation input control circuit unit 29.

Figure 2:
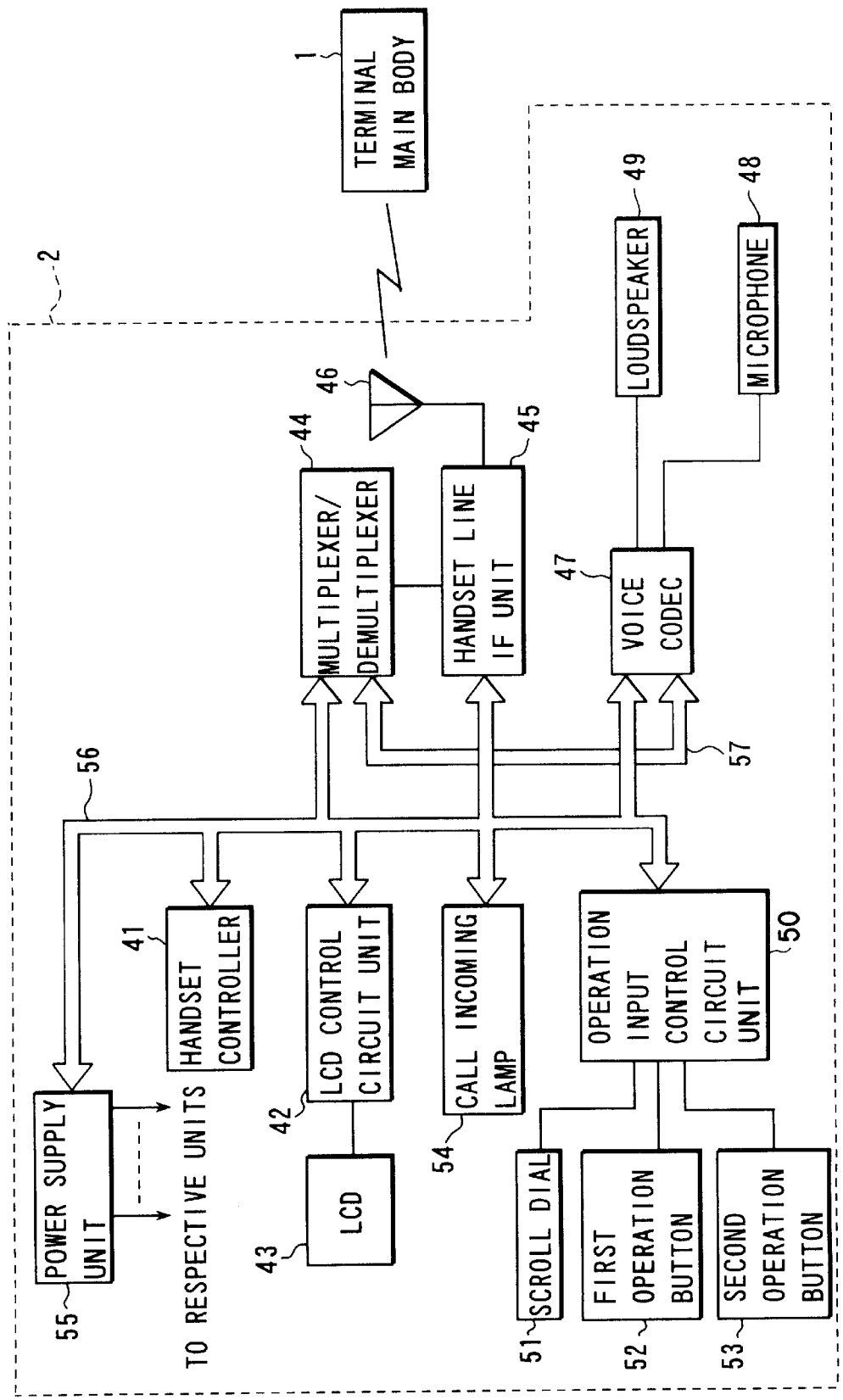
FIG. 2 is a block diagram showing the detailed arrangement of a handset.
Figure 4A:
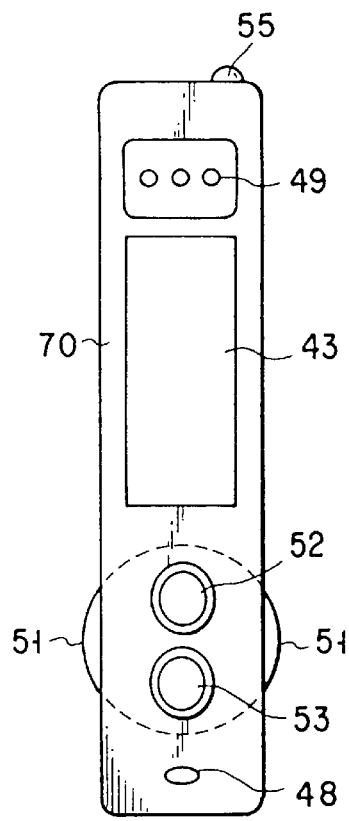
FIG. 4 is a view showing the outer appearance of the handset.
Figure 4B:
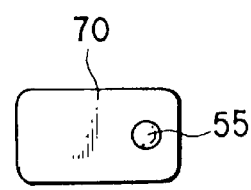
Figure 4C:
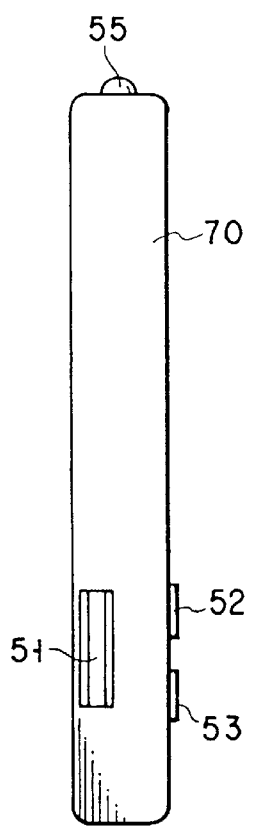
Figure 4D:
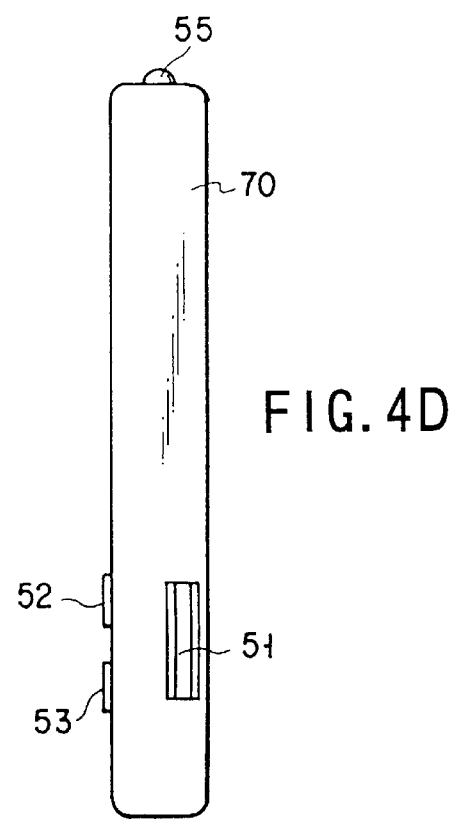

FIG. 2 is a block diagram showing the detailed arrangement of the handset 2.

As shown in FIG. 2, the handset 2 has a handset controller 41, LCD control circuit unit 42, LCD 43, multiplexer/demultiplexer 44, handset line interface unit (handset line I/F unit) 45, antenna 46, voice codec 47, microphone 48, loudspeaker 49, operation input control circuit unit 50, scroll dial 51, first operation button 52, second operation button 53, call incoming lamp 54, and power supply unit 55. Of these units, the handset controller 41, LCD control circuit unit 42, multiplexer/demultiplexer 44, handset line interface unit 45, voice codec 47, operation input control circuit unit 50, call incoming lamp 54, and power supply unit 55 are connected to each other via a main bus 56. Also, the multiplexer/demultiplexer 44 and voice codec 47 are connected to each other via a synchronization bus 57.

The handset controller 41 has a CPU, ROM, RAM, and the like, and systematically controls the respective units of the handset 2 to realize operations of the handset. The handset controller 41 implements processing means for implementing various functions (to be described later) by software processing.

The LCD control circuit unit 42 controls the LCD 43 to display a text image represented by text data supplied from the handset controller 41 or multiplexer/demultiplexer 44. The LCD 43 is a monochrome LCD, and displays a text image under the control of the LCD control circuit unit 42.

The multiplexer/demultiplexer 44 multiplexes encoded voice data supplied from the voice codec 47 via the synchronization bus 57, and other data supplied from the handset controller 41 via the main bus 56 by the above-mentioned multiplex scheme for the handset channel, and supplies transmission data obtained as a result of multiplexing to the handset line interface unit 45. The multiplexer/demultiplexer 44 demultiplexes encoded voice data and other data from the transmission data supplied from the handset line interface unit 45, and supplies these data to the voice codec 47 and handset controller 41, respectively. The handset line interface unit 45 exchanges transmission data with the terminal main body .1 by radio via the antenna 46.

The voice codec 47 has two operation modes, i.e., a multimedia communication mode and voice conversation mode, and operates in the mode (common to the mode setup of the voice codec 23 in the terminal main body 1) designated by the handset controller 41 on the basis of an instruction from the main controller 11. In the multimedia communication mode, the voice codec 47 converts a voice signal output from the microphone 48 into a digital signal, and encodes the digital signal by a predetermined low-rate voice encoding scheme (e.g., ITU-T recommendation G729) to obtain encoded voice data. The voice codec 47 supplies this encoded voice data to the multiplexer/demultiplexer 44 via the synchronization bus 57. Also, in the multimedia communication mode,.the voice codec 47 decodes a low-rate voice code in encoded voice data supplied from the multiplexer/demultiplexer 44, and converts the decoded code into an analog signal to obtain a voice signal. The voice codec 47 supplies this voice signal to the loudspeaker 49. By contrast, in the voice conversation mode, the voice codec 47 converts a voice signal output from the microphone 48 into a digital signal, and encodes the digital signal by 32-kbps ADPCM (ITU-T recommendation G721) to obtain encoded voice data. The voice codec 47 supplies this encoded voice data to the multiplexer/demultiplexer 44. Also, in the voice conversation mode, the voice codec 47 decodes an ADPCM code in encoded voice data supplied from the multiplexer/demultiplexer 44, and converts the code into an analog signal to obtain a voice signal. The voice codec 47 supplies this voice signal to the loudspeaker 49. Note that the microphone 48 converts a voice spoken nearby into a voice signal and supplies it to the voice codec 57. The loudspeaker 49 outputs a voice signal supplied from the voice codec 47 as a voice. In the above description, a code of the low-rate voice encoding scheme (e.g., ITU-T recommendation G.729) or ADPCM is encoded or decoded at the handset 2. However, the present invention is not limited to such specific system, and the terminal main body 1 may exchange these schemes and PCM encoding scheme with each other, and may exchange a voice code based on the PCM encoding scheme with the handset or may exchange an analog voice signal.

The operation input control circuit unit 50 is connected with the scroll dial 51, first operation button 52, and second operation button 53. The operation input control circuit unit 50 accepts user's instruction operations at these scroll dial 51, first operation button 52 and second operation button 53, and informs the handset controller 41 of the contents of instruction operations. The scroll dial 51 accepts a cursor movement instruction, display screen scroll instruction, and the like. The first and second operation buttons 52 and 53 accept inputs of a determination instruction and cancel instruction.

Note that the operation input control circuit unit 50 performs control operations pertaining to detection of the rotation direction and stress direction of the scroll dial 51.

The call incoming lamp 54 is lighted under the control of the handset controller 41, and informs the user of reception of an incoming call.

The power supply unit 55 has, e.g., a battery as a power supply, and supplies electric power to the respective units of the handset 2. The power supply unit 55 turns power supply to the respective units on/off under the control of the handset controller 41. However, the power supply unit 55 always supplies electric power to at least the handset controller 41 and operation input control circuit unit 50.

FIG. 3 is a view showing the outer appearance of the terminal main body 1 and camera unit 4. Note that the same reference numerals denote the same parts as in FIG. 1.

As shown in FIG. 3, the terminal main body 1 has a box-shaped housing 60, which stores the above-mentioned building elements of the terminal main body 1.

The video LCD 14 and text LCD 16 are located so that their display surfaces are exposed outside the housing 60 from one surface of the housing 60.

The scroll dial 31 is located on one of the four surfaces (to be referred to as housing side surfaces hereinafter) that intersect the surface (to be referred to as a housing front surface hereinafter) on which the video LCD 14 and text LCD 16 are located. The first and second operation buttons 32 and 33, and power supply button 34 are located on a housing side surface neighboring that surface of the housing 60, on which the scroll dial 31 is located. Note that the relative positions of the scroll dial 31, and first and second operation buttons 32 and 33 are determined in consideration of the palm size of the hand of a human being, so that when the end portion of the housing 60 is placed on the palm of one hand, the user can operate the scroll dial 31 with the thumb of that hand, while operating the first and second operation buttons 32 and 33 with the remaining fingers.

The earphone/microphone terminal 24 is located on the same housing side surface as that on which the scroll dial 31 is located. The position of the earphone/microphone terminal 24 is determined so that the earphone/microphone 3 (not shown in FIG. 3) attached does not disturb operations of the scroll dial 31.

The camera terminal 26 is located on the housing side surface on the side opposite to that on which the scroll dial 31 is located.

The camera unit 4 is constructed by coupling a camera unit main body 4a and support portion 4b via a hinge portion 4c, and is attached to the terminal main body 1 by inserting the support portion 4b into a recess portion 61, which is formed on the same housing side surface as that of the first and second operation buttons 32 and 33, and power supply button 34. Furthermore, the camera unit 4 is electrically connected to the terminal main body 1 by inserting a plug connected to the distal end of a connection line (not shown) into the camera terminal 26. As the recess portion 61, two recess portions, i.e., a recess portion 61-1 near the housing front surface and a recess portion 61-2 near a surface (to be referred to as a housing rear surface hereinafter) opposite to the housing front surface, are formed. With this arrangement, when the support portion 4b is inserted into the recess portion 61-1 near the housing front surface, as shown in FIG. 3, the photographing direction of the camera unit 4 agrees with the housing front surface side; when the support portion 4b is inserted into the recess portion 61-2 near the housing rear surface with the camera unit 4 facing the side opposite to that in FIG. 3, the photographing direction of the camera unit 4 agrees with the housing rear surface side. Also, the camera unit main body 4a is pivotal about the hinge portion 4c, and can change its photographing angle.

FIG. 4 is a view showing the outer appearance of the handset 2. Note that the same reference numerals denote the same parts as in FIG. 2.

As shown in FIG. 4, the handset 2 has a box-shaped housing 70, which stores the above-mentioned building elements of the handset 2. Note that the housing 70 is very smaller than the housing 60 of the terminal main body 1.

The LCD 43 is located so that its display surface exposes outside the housing 70 from one surface (to be referred to as a housing front surface hereinafter) of the housing 70. Also, the microphone 48, loudspeaker 49, and first and second operation buttons 52 and 53 are located on this housing front surface.

The scroll dial 51 is located to partially project outside the housing 70 from two opposing surfaces of the four surfaces (to be referred to as housing side surfaces) that intersect the surface (to be referred to as a housing front surface hereinafter) where the LCD 43 is located. Note that the relative positions of the scroll dial 51, and first and second operation buttons 52 and 53 are determined in consideration of the palm size of the hand of a human being, so that when the end portion of the housing 70 is placed on the palm of one hand, the user can operate the scroll dial 51 with the thumb of that hand, while operating the first and second operation buttons 52 and 53 with the remaining fingers.

The call incoming lamp 54 is located on one of the housing side surfaces, which is different from those from which the scroll dial 51 projects.

The schematic operation of the communication terminal apparatus with the above-mentioned arrangement will be explained below.

The main controller 11 waits for depression of the power supply button 34 in a power OFF state. Upon depression of the power supply button 34, the main controller 11 controls the power supply unit 36 to start supply of electric power to the respective units, thus shifting to a power ON state.

The communication terminal apparatus of this embodiment has, as its principal operation modes, a telephone mode, videophone mode, and data communication mode. The main controller 11 immediately after the power ON state has started, as mentioned above, is set in a standby state. In the standby state, the main controller 11 controls the text LCD control circuit unit 15 to display a main menu screen for selecting one of the telephone, videophone, and data communication modes on the text LCD 16. Also, on the main menu screen, a cursor is displayed to overlap an operation mode name (a predetermined operation mode name in an initial state) as a current selection candidate.

While such main menu screen is displayed, the main controller 11 waits for selection operation (a change and determination instruction of the selection candidate) of one of these modes. Note that the main menu screen may have a size larger than the text LCD 16, and may change its display region upon operation of the scroll dial 31 (to be described later).

When the scroll dial 31 is operated in this state, the main controller 11 determines that a change instruction of the selection candidate has been issued. At this time, the main controller 11 receives information of the rotation direction and amount of the scroll dial 31 from the operation input control circuit unit 29, changes the selection candidate in the order corresponding to the rotation direction at predetermined increments of the rotation amount, and moves the cursor to always display it overlapping the mode name of the selection candidate.

When the first operation button 32 is double-clicked, the main controller 11 determines that a determination instruction has been issued. At that time, the main controller 11 shifts to a processing routine of the operation mode as a current selection candidate. Note that the main controller 11 may receive the change and determination instructions of the selection candidate on the basis of inputs on the touch panel 30.

The operations in the respective operation modes will be described in turn below along the processing sequence of the main controller 11.

Telephone Mode

This operation mode allows voice conversations as a PHS terminal.

In this operation mode, the main controller 11 sets the operation mode of the multiplexer/demultiplexer 17 and voice codec 23 in the voice conversation mode. The main controller 11 then controls the text LCD control circuit unit 15 to display a predetermined telephone number designation method menu screen on the text LCD 16. This telephone number designation method menu screen presents choices such as "number input mode", "telephone book search mode", and the like. The main controller 11 displays a cursor to overlap the choice as a current selection candidate. While such telephone number designation method menu screen is displayed, the main controller 11 waits for input operation of the telephone number designation method. Note that the telephone number designation method menu screen may have a size larger than the text LCD 16, and may change its display region upon operation of the scroll dial 31 (to be described later).

Upon operation of the scroll dial 31 in this state, the main controller 11 determines that a change instruction of the selection candidate has been issued. At that time, the main controller 11 changes the choice of the selection candidate in the order corresponding to the rotation direction at predetermined increments of the rotation amount, and moves the cursor to always display it overlapping the choice of the selection candidate.

When the first operation button 32 is double-clicked, the main controller 11 determines that a determination instruction has been issued. At that time, the main controller 11 shifts to telephone number accept processing by the designation method corresponding to the choice as a current selection candidate.

When "number input mode" is selected, the main controller 11 controls the text LCD control circuit unit 15 to display a predetermined number input screen that presents a list of numerals (0 to 9, *, and #) on the text LCD 16. Also, on the number input screen, a cursor is displayed to overlap a numeral as a current selection candidate. While such telephone number input screen is displayed, the main controller 11 waits for input operations of a called telephone number. Note that the telephone number input screen may have a size larger than the text LCD 16, and may change its display region upon operation of the scroll dial 31 (to be described later).

Upon operation of the scroll dial 31 in this state, the main controller 11 determines that the change instruction of the selection candidate has been issued. At that time, the main controller 11 changes the numeral as a selection candidate in the order corresponding to the rotation direction at predetermined increments of the rotation amount, and moves the cursor to always display it overlapping the numeral of the selection candidate.

When the first operation button 32 is clicked, the main controller 11 determines that a determination instruction of the numeral of the first digit of the telephone number has been issued. Then, the main controller 11 fetches the numeral as a current selection candidate to be the lowermost digit of the numeral string designated so far.

When the first operation button 32 is double-clicked, the first controller 11 determines that a determination instruction of the telephone number has been issued. At that time, the main controller 11 fetches the numeral as a current selection candidate to be the lowermost digit of the numeral string designated so far, and settles the numeral string fetched so far as a called telephone number. During input operations of the telephone number, the main controller 11 controls the text LCD control circuit unit 15 to display the fetched numeral string on the text LCD 16.

On the other hand, when "telephone book search mode" is selected, the main controller 11 controls the text LCD control circuit unit 15 to display a telephone book search screen on the text display 16. Also, on the telephone book search screen, a cursor is displayed to overlap a called telephone number as a current selection candidate. While such telephone book search screen is displayed, the main controller 11 waits for selection operation of a called telephone number. Note that the telephone book search screen may have a size larger than the text LCD 16, and may change its display region upon operation of the scroll dial 31 (to be described later).

Upon operation of the scroll dial 31 in this state, the main controller 11 determines that a change instruction of the selection candidate has been issued. At that time, the main controller 11 changes the selection candidate in the order corresponding to the rotation direction at predetermined increments of the rotation amount, and moves the cursor to always display it overlapping the selection candidate.

When the first operation button 32 is double-clicked, the main controller 11 determines that a determination instruction of the telephone number has been issued. At that time, the main controller 11 settles the telephone number as a current selection candidate to be a called telephone number.

Note that designation of the telephone number using the telephone book search screen can be used not only in this telephone mode but also in the videophone mode (multimedia communication mode) and data communication mode. In this case, telephone books of the individual modes are used.

In this embodiment, by inputting a number or using the telephone book information of the terminal main body 1, the user can also place a call at the handset 2. A mechanism of the handset 2 according to one characteristic feature of the present invention, which allows a number input and telephone book search, will be explained below.

Along with a recent size reduction of portable terminals, a layout space for keys for inputting telephone numbers cannot be assured. Also, a dial telephone number input/selection method is known, as described in a reference (Jpn. Pat. Appln. KOKAI Publication No. 8-321869). However, this method assumes only one hand (e.g., the right hand) as a hand that operates a terminal, and allows dial operations on one side. For this reason, a problem of right- or left-handedness is posed in view of ergonomics. That is, a terminal that assumes, e.g., a right-handed person is not easy for a left-handed person to operate.

On the other hand, the handset of this embodiment has a mechanism for allowing dial operations on the two sides of the housing. More specifically, to restate, in the handset 2, the scroll dial 51 projects from the two side surfaces of the housing 70, as shown in FIG. 4, and can be easily operated even when the user holds the housing with either the right or left hand.

Meanwhile, when the choice screen is scrolled in the same direction as the rotation direction of the scroll dial 51, the change direction of choices or the like in correspondence with the finger movement of the left hand is opposite to that of the right hand, thus disturbing the user's sense of direction. In order to solve this problem, the scroll dial 51 comprises a stress direction sensor to detect the right or left hand that is making operation, and sets an opposite change direction of choices or the like corresponding to the rotation direction of the scroll dial in correspondence with the right- or left-handed operation, i.e., on the basis of the detection result.

More specifically, the scroll dial 51 comprises the stress direction sensor for detecting whether the user is operating on the right or left side of the dial, in addition to a rotation operation direction sensor.

When the stress direction sensor detects that the user is operating on the right side of the dial, and the rotation operation direction sensor directs clockwise operation, information such as a telephone number and the like displayed on the LCD display device of the handset scrolls downward; when the rotation operation direction sensor detects counterclockwise operation, the information scrolls upward.

On the other hand, when the stress direction sensor detects that the user is operating on the left side of the dial, and the rotation operation direction sensor detects clockwise operation, information such as a telephone number and the like displayed on the LCD display device of the handset scrolls upward; when the rotation operation direction sensor detects counterclockwise operation, the information scrolls downward.

The mechanism for detecting stress will be explained below with reference to FIG. 5.

As shown in FIG. 5, a rotation central shaft 201 of a rotary encoder 200 is movable in a one-dimensional (right or left) direction by external stress, and this shaft presses one of right and left switches 203. The rotation central shaft 201 has elastic members such as springs, and returns to its initial position when external stress disappears.

To recapitulate, since the information scroll direction and dial operation direction agree with each other even when the user holds the housing with either the right or left hand, operability can be improved. Since the change direction of choices or the like is determined in correspondence with the rotation direction of the scroll dial 51, the change directions (scroll directions) of choices or the like in correspondence with finger movements by the right and left hands agree with each other. Hence, the user does not feel disturbed.

Note that the right or left operation direction of the dial may be detected not only by the stress sensor but also by another sensor. Also, dials which have a 360° rotation angle and limited rotation angle (e.g., within 180°) are known, and the present invention can be applied to both these dials.

FIG. 6 is a view showing another example of the arrangement of the stress direction sensor of the scroll dial 51. In the arrangement example shown in FIG. 6, the operation direction of the dial 51 is detected by a skin contact sensor 401.

Note that the skin contact sensor 401 is located on one of the right and left sides of the front surface of the handset 2. FIG. 7 shows the detection method of the operation direction on the basis of the output (ON or OFF) from the skin contact sensor 401.

Figure 8:
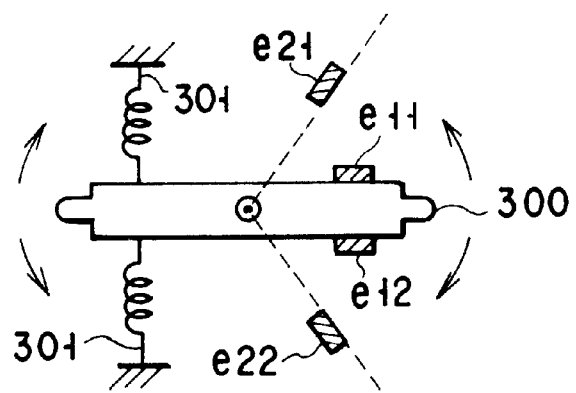
FIG. 8 is a view showing an example of the arrangement of the scroll dial which rotates only a predetermined angle.
Figure 9:
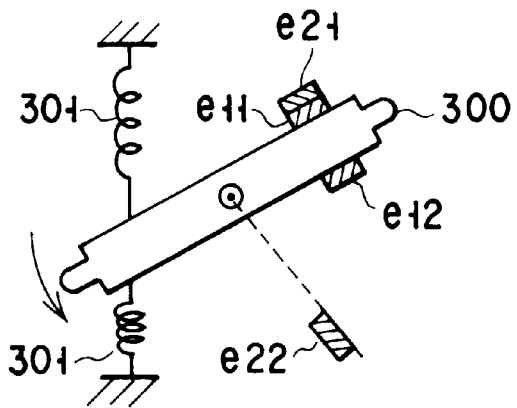
FIG. 9 is a view showing an example of the arrangement of the scroll dial which rotates only a predetermined angle.
Figure 10:
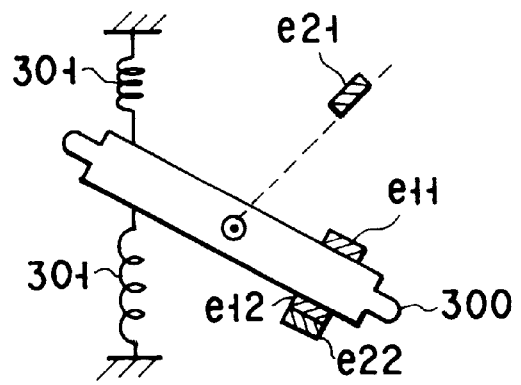
FIG. 10 is a view showing an example of the arrangement of the scroll dial which rotates only a predetermined angle.

FIGS. 8 to 10 are views showing an example of the arrangement of a scroll dial which rotates only a predetermined angle. In this arrangement example, electrodes e11 and e12 are mounted on one end of a member 300 of a dial in a radial direction, and springs 301 are connected to the another end of the dial to sandwich the center of rotation of that dial therebetween. One end of each spring 301 is connected to the member 300, and the another end thereof is connected to the housing of the handset. Electrodes e21 and e22 are fixed to the housing of the handset and contact one of the electrodes e11 and e12 of the member 300 upon rotation of the member 300 through a predetermined angle. That is, FIG. 9 shows a state wherein the member 300 rotates counterclockwise and the electrodes e11 and e21 contact each other, and FIG. 10 shows a state wherein the member 300 rotates clockwise, and the electrodes e12 and e22 contact each other.

Hence, by electrically discriminating the contact of these electrodes, the rotation direction of the member 300, i.e., the dial, can be detected.

Videophone Mode

In this operation mode, videos can be exchanged while making voice conversations.

In this operation mode, the main controller 11 sets the operation mode of the multiplexer/demultiplexer 17 and voice codec 23 in the voice conversation mode in an initial state. Then, the main controller 11 accepts the designated called telephone number and places a call in the same manner as in the above-mentioned telephone mode.

When a communication path is formed with a terminal (a partner terminal) of the called party via the PHS network, the main controller 11 negotiates with the partner terminal in accordance with a predetermined protocol (e.g., ITU-T recommendation H.245) to confirm if the partner terminal can perform video/voice multiplex communications, and grants execution of the video/voice multiplex communications.

If the terminal on the other hand of the line is not capable of video/voice multiplex communications or denies execution of video/voice multiplex communications, the main controller 11 shifts to the telephone mode to allow voice conversations alone.

On the other hand, if the partner terminal is capable of video/voice multiplex communications and grants execution of video/voice multiplex communications, the main controller 11 switches the operation mode of the multiplexer/demultiplexer 17 and voice codec 23 to the multimedia communication mode.

In the multimedia communication mode, encoded voice data, encoded video data, and other data output from the main controller 11 are multiplexed by the multiplexer/demultiplexer 17. The encoded voice data is obtained by encoding a voice signal generated by the earphone/microphone 3 by the voice codec 23 in accordance with a low-rate voice encoding scheme. On the other hand, the encoded video data is obtained by encoding a video signal generated by the camera unit 4 by the video encoder 27 in accordance with MPEG4 or ITU-T recommendation H.263. The multiplexed data obtained by the multiplexer/demultiplexer 17 in this way is sent to the partner terminal as transmission data via the PHS I/F unit 18 and antenna 19.

On the other hand, transmission data sent from the partner terminal (i.e., reception data) is demultiplexed into encoded voice data, encoded video data, and other data by the multiplexer/demultiplexer 44. The encoded voice data is decoded into a voice signal by the voice codec 23, and is output as a voice from the earphone/microphone 3. The encoded video data is decoded into video data by the video decoder 12, and a video display is made on the video LCD 14 on the basis of this video data under the control of the video LCD control circuit 13.

In this fashion, while talking using the earphone/microphone 3, an arbitrary video sensed by the camera unit 4 is transmitted to the partner terminal, and a video sent from the partner terminal can be observed on the video LCD 14.

Note that the photographing direction of the camera unit 4 may agree with either the housing front surface side or housing rear surface side. Hence, by setting the photographing direction of the camera unit 4 on the housing front surface side, the user's face can be displayed on the partner terminal, by setting the photographing direction of the camera unit 4 on the housing rear surface side, a video of an object other than the user can be displayed on the partner terminal.

In this videophone mode, the main controller 11 controls the text LCD control circuit unit 15 to display a predetermined video operation menu screen on the text LCD 16. This video operation menu screen presents choices such as "video switching", "display method switching", "display region adjustment", "local video zoom operation", "remote video zoom operation", and the like. The main controller 11 displays a cursor to overlap the choice as a current selection candidate. While such video operation menu screen is displayed, the main controller 11 waits for designation operation of execution of video operation. Note that the video operation menu screen may have a size larger than the text LCD 16, and may change its display region upon operation of the scroll dial 31 (to be described later).

Upon operation of the scroll dial 31 in this state, the main controller 11 determines that a change instruction of the selection candidate has been issued. At that time, the main controller 31 changes the choices in the order corresponding to the rotation direction at predetermined increments of the rotation amount, and moves the cursor to always display it overlapping the choice of the selection candidate.

When the first operation button 32 is double-clicked, the main controller 11 determines that a determination instruction of video operation to be executed has been issued. At that time, the main controller 11 shifts to video operation processing corresponding to the choice as a current selection candidate.

Video Switching

When a video sent from a remote terminal (to be referred to as a remote video hereinafter) is being displayed on the video LCD 14, upon selection of "video switching", the main controller 11 controls to display a video sensed by the camera unit 4 (to be referred to as a local video hereinafter) on the video LCD 14. That is, the main controller controls the video decoder 12 to decode encoded video data output from the video encoder 27.

Also, when a local video is being displayed on the video LCD 14 upon selection of "video switching", the main controller 11 controls to display a remote video on the video LCD 14. That is, the main controller controls the video decoder 12 to decode encoded video data output from the multiplexer/demultiplexer 17.

Display Method Switching

When "reduced-size display" mentioned above is being made upon selection of "display method switching", the main controller 11 switches it to "equal-size display"; when "equal-size display" mentioned above is being made upon selection of "display method switching", the main controller 11 switches it to "reduced-size display".

Display Region Adjustment

When a remote video is displayed by "equal-size display" or when a partial display is made by zoom display (to be described later), the main controller 11 enables selection of "display region adjustment". Upon selection of "display region adjustment", the main controller 11 waits for a movement instruction of the display region.

Upon operation of the scroll dial 31 in this state, the main controller 11 determines that a change instruction of the selection candidate has been issued. At this time, the main controller 11 changes the choice of the selection candidate in the order corresponding to the rotation direction at predetermined increments of the rotation amount, and moves the cursor to always display it overlapping the choice of the selection candidate.

When the first operation button 32 is double-clicked, the main controller 11 determines that a determination instruction of video operation to be executed has been issued. The main controller 11 shifts to video operation processing corresponding to the choice as a current selection candidate.

When the scroll dial 31 is operated while a remote video is being displayed by "equal-size display", the main controller 11 determines that a movement instruction of the display region has been issued. At this time, the main controller 11 changes the display region by a moving amount corresponding to the rotation amount of the scroll dial in a direction concordant with the rotation direction of the scroll dial 31. The direction to change the display region is the vertical direction when the local terminal is placed in a landscape state and a video is cut in the vertical direction, as indicated by I55 in FIG. 24, or is the horizontal direction when the local terminal is placed in a portrait state and a video is cut in the horizontal direction, as indicated by I65 in FIG. 25.

When the scroll dial 31 is operated without pressing the first operation button 32 while making a partial display by zoom display, the main controller 11 determines that a movement instruction of the display region in the horizontal direction has been issued. At this time, the main controller 11 changes the display region by the moving amount corresponding to the rotation amount of the scroll dial 31 in the movement direction (rightward or leftward) concordant with the rotation direction of the scroll dial 31. On the other hand, when the scroll dial 31 is operated with the first operation button 32 pressed while making a partial display by zoom display, the main controller 11 determines that a movement instruction of the display region in the vertical direction has been issued. At this time, the main controller 11 changes the display region by the moving amount corresponding to the rotation amount of the scroll dial 31 in the movement direction (upward or downward) concordant with the rotation direction of the scroll dial 31.

Local Video Zoom Operation

The main controller 11 enables selection of "local video zoom operation" while a local video is being displayed. Upon selection of "local video zoom operation", the main controller 11 waits for zoom operation.

Upon operation of the scroll dial 31 in this state, the main controller 11 determines that zoom operation has been done. At this time, the main controller 11 zooms a local video displayed on the video LCD 14 at a ratio corresponding to the rotation amount of the scroll dial 31. Note that the main controller 11 determines enlargement/reduction in correspondence with the rotation direction of the scroll dial 31.

Note that zoom processing of a local video is implemented by performing data processing of video data output from the camera unit 4 by, e.g., the camera interface unit 25.

Remote Video Zoom Operation

The main controller 11 enables selection of "remote video zoom operation" while a remote vide is being displayed. Upon selection of "remote video zoom operation", the main controller 11 waits for zoom operation.

Upon operation of the scroll dial 31 in this state, the main controller 11 determines that zoom operation has been done. At this time, the main controller 11 determines the zoom ratio from the rotation amount of the scroll dial 31 and enlargement/reduction from the rotation direction of the scroll dial 31, generates a zoom request that indicates them, multiplexes the request in transmission data as other data, and informs the remote terminal of it.

Upon reception of such zoom request from the remote terminal, the main controller 11 performs zoom processing indicated by the zoom request, and sends a zoomed video to the remote terminal.

Note that zoom processing of a video is implemented by performing data processing of video data output from the camera unit 4 by, e.g., the camera interface unit 25.

As described above, according to this embodiment, a communication terminal apparatus which is very easy to operate even when it is operated while being held with a hand, and can be satisfactorily used in various situations, can be provided.

Second Embodiment

The second embodiment relates to a communication terminal system constructed by combining a video/voice communication terminal and voice communication terminal.

A communication terminal system of this embodiment is constructed by combining a video/voice communication terminal (corresponding to the terminal main body 1 of the first embodiment) and a voice communication terminal (corresponding to the handset 2 of the first embodiment), and further has the following features.

(1) Communication Type Information

Communication type information indicating one of a voice communication, a multimedia communication complying with ITU-T recommendation H.324 or its modification (to be referred to as an "H.324 equivalent multimedia communication" hereinafter), and data communication is appended to a call control message (call setup, response, response acknowledgement) upon connecting a channel in a non-limited digital communication mode.

(2) Transmission of Communication Type Information

The communication type information itself is identified by a subaddress or called number contained in the call control message or is transmitted using an inter-user information message.

(3) Response 1 by Voice Communication Terminal

Upon reception of an H.324 equivalent multimedia communication call setup request using the non-limited digital communication mode from an originating terminal, when a terminal having only a voice communication function is to respond, it informs the originating terminal that it can respond by a voice communication based on the voice encoding scheme (ADPCM in case of a PHS) in the voice communication mode in place of the H.324 equivalent multimedia communication, thus allowing voice communications with the originating terminal in accordance with this scheme.

(4) Shift to Multimedia Communication

Using a tone signal during voice communications based on above-mentioned ADPCM, the communication mode with the partner terminal can be switched to an H.324 equivalent multimedia communication mode.

(5) Denial of Voice Communication

When the originating terminal denies a response based on the voice encoding scheme (ADPCM encoding scheme) in the voice communication mode of the terminating terminal, a negotiation for the H.324 equivalent multimedia communication is made, and a connection for voice communications is established prior to video or data communications.

(6) Response 2 by Voice Communication Terminal

Upon reception of an H.324 equivalent multimedia communication call setup request using the non-limited digital communication mode from an originating terminal, when a terminal having only a voice communication function is to respond, it establishes a connection for voice communications prior to video or data communications in a negotiation for the H.324 equivalent multimedia communications.

(7) Data Communication

In case of data communications, automatic termination is set, and a communication application of a host computer processes data exchange. When user's operation is requested, a corresponding message is sent.

Figure 11:
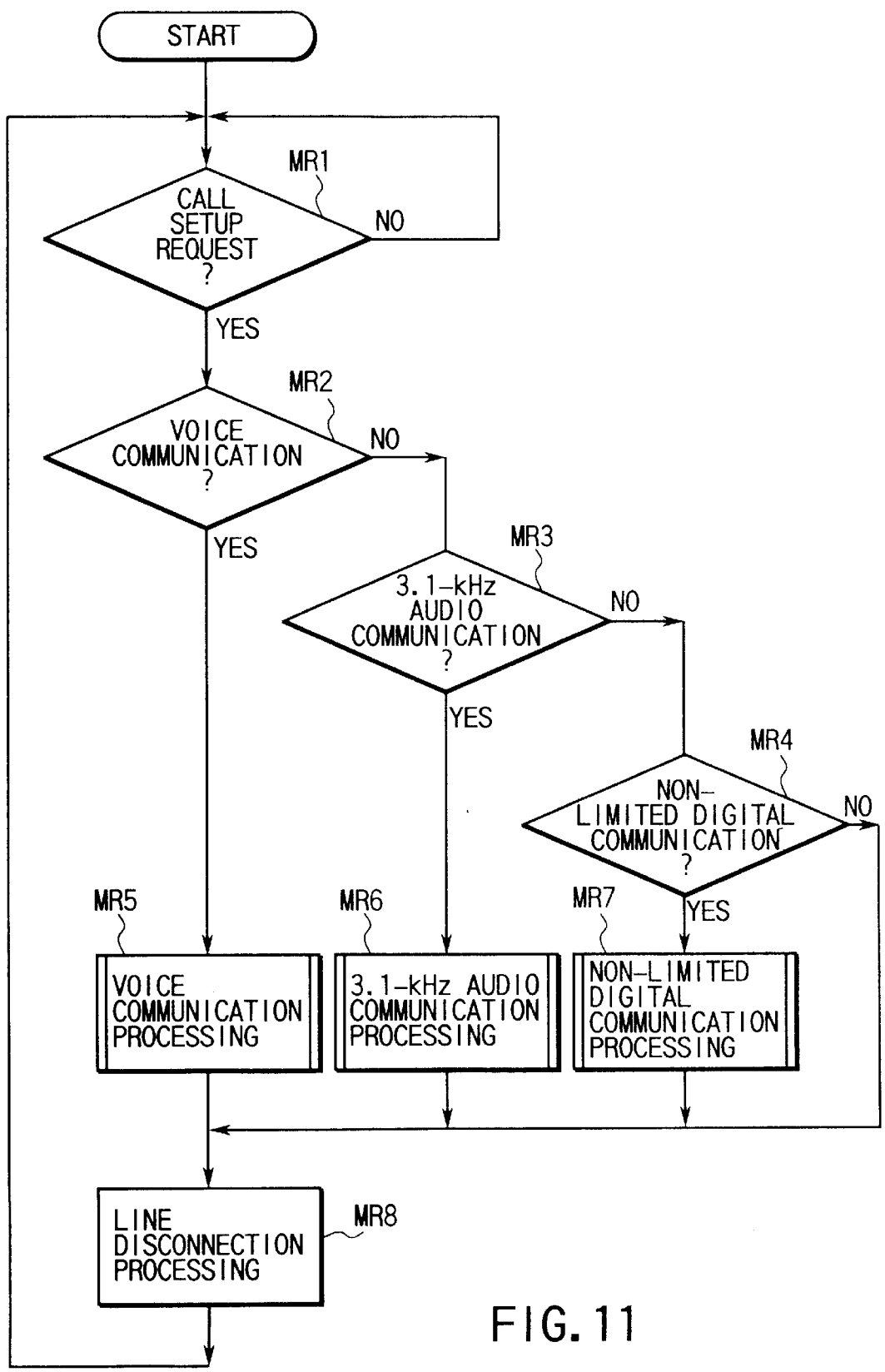
FIG. 11 is a flow chart showing an example of the main routine of a communication terminal system according to the second embodiment of the present invention upon reception of an incoming call.

FIG. 11 is a flow chart showing an example of the main routine of the communication terminal system according to this embodiment upon reception of an incoming call.

In step MR1, the control waits for a call setup request sent from the calling party. Upon reception of the call setup request, it is checked if that request is in a voice mode, as shown in step MR2. When voice communications in the voice mode are to be made, the flow advances to step MR5 to execute voice communication processing. Upon completion of the voice communication processing in the voice mode, line disconnection processing is executed (step MR8), and the flow returns to step MR1 to wait for a call setup request.

If it is determined in step MR2 that the: received request is not a call setup request in the voice mode, 3.1-kHz audio communication processing (step MR6) is executed depending on the discrimination result in step MR3 or non-limited digital communications (step MR7) are made depending on the discrimination result in step MR4. Note that the 3.1-kHz audio communication processing includes communication processing using a G3 facsimile or data modem, and the non-limited digital communication processing includes processing pertaining to a videophone, G4 facsimile communications, or data communications. After the 3.1-kHz audio communication processing or non-limited digital communications, the flow advances to step MR8 to execute line disconnection processing.

A video/voice communication terminal (corresponding to the terminal main body 1 of the first embodiment) such as a videophone terminal inevitably has a large size since it comprises a video display device and video input device.

Figure 12:
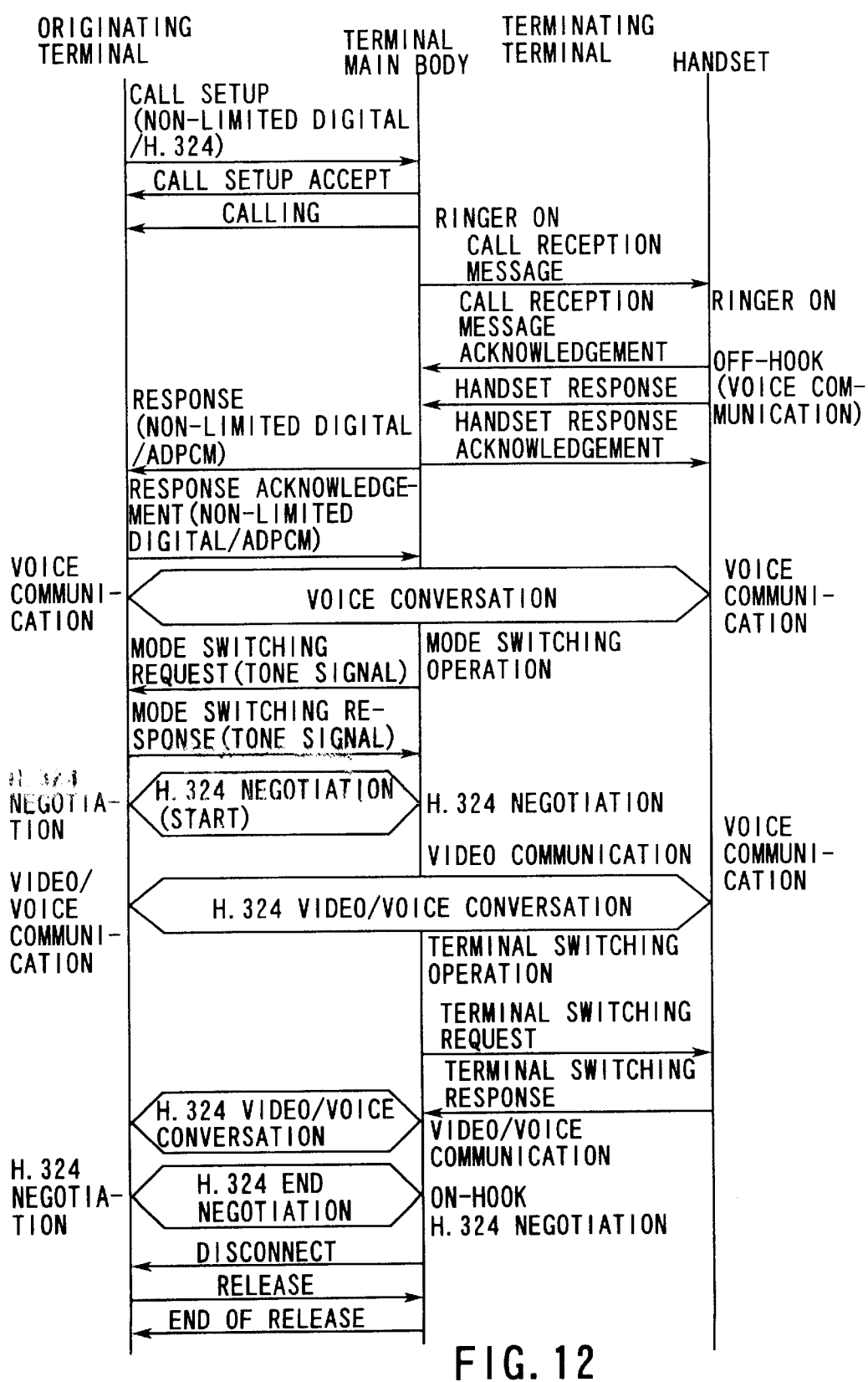
FIG. 12 is a chart showing an example of a switching control sequence upon reception of an incoming call.

When a handset having a voice conversation function alone is used, a call for multimedia communications using video and voice data cannot be received. Upon reception of an incoming call from another terminal, a handset terminal receives information indicating that it is capable of voice conversation alone, and temporarily responds (goes off-hook) to make voice conversation in case of voice conversations or multimedia communications, and a main body terminal is operated as needed, thus allowing the main body terminal to switch between the voice conversations and multimedia conversations. In case of data communications, a portion of received data, e.g., a sender address in case of an e-mail, or the entire received data is sent to the handset to display the received data. Some sequences of switching control upon reception of an incoming call according to such characteristic features of this embodiment will be explained below. FIG. 12 shows an example of such sequences.

In this sequence, an originating terminal places a call by setting the non-limited digital mode as transmission performance in its call setup message, and appending call type information indicating a multimedia communication complying with H.324 or equivalence to a predetermined field of an inter-user information message that can be contained in the call setup message. Note that the present invention is not limited to this embodiment that transmits communication type information using inter-user information. For example, communication type information may be transmitted and identified using transmission performance, subaddress, called number, and calling number.

Upon reception of the call setup message from the originating terminal, the terminal main body of the terminating terminal recognizes the message, transmits a call setup accept message and calling message to the originating terminal, and rings its own ringer to issue a call reception message to the handset to inform the user of an incoming call. Note that vibrations of a vibrator, flickering of a light-emitting diode or the like, and so forth may be used in place of ringing of the ringer.

Upon reception of the call reception message, the handset rings its own ringer, and informs the terminal main body of call reception message acknowledgement. Note that vibrations of a vibrator, flickering of a light-emitting diode or the like, and so forth may be used in place of ringing of the ringer as in the terminal main body.

When the operator responds for voice communications by lifting the handset to go off-hook, the handset issues to the terminal main body a handset response for informing the terminal main body that the handset itself has responded to the call.

Upon reception of the handset response from the handset, the terminal main body sends a handset response acknowledgement that informs the handset of reception of the response from the handset. Also, the terminal main body sets the non-limited digital mode as transmission performance, appends communication type information indicating that a response based on the voice encoding scheme. (e.g., ADPCM in a PHS) for the voice mode can be made to a field of an inter-user information message that can be contained in a response message, and sends the response message to the originating terminal.

Upon reception of the response message indicating the non-limited digital communication mode and that the response based on the voice encoding scheme for the voice mode can be made, the originating terminal checks if the own terminal can make equivalent communications, appends communication type information indicating that checking result to a field of an inter-user information message that can be contained in a response acknowledgement message, and sends the response acknowledgement message to the terminating terminal.

When communications based on the voice encoding scheme for the voice mode in the non-limited digital communication mode are enabled, voice communications according to the voice encoding scheme for the voice mode are made between the originating and terminating terminals in the non-limited digital communication mode.

On the other hand, when communications based on the voice encoding scheme for the voice mode in the non-limited digital communication mode are disabled, a negotiation for multimedia communications complying with H.324 as ITU-T standard or its equivalent is started, and a connection for voice communications is established prior to other kinds of information, thus quickly starting voice communications.

During voice communications, the terminating terminal sends a mode switching request using a dial tone signal. Upon recognition of the mode switching request, the originating terminal sends a mode switching response signal to the terminating terminal using a dial tone signal. Note that such signals are not limited to dial tone signals, and may use a combination of frequencies, a combination of phases, a modulated specific code, repetition of a modulated specific code, and the like. On the other hand, when the originating terminal has already detected that the terminating terminal is capable of multimedia communications, the originating terminal may issue a mode switching request. Upon switching, mode switching may be done by performing mode switching operations at the individual terminals after the operators of the originating and terminating terminals agree with each other by voice communications. Alternatively, after mode switching operation, a state for exchanging signals such as dial tone signals or the like may be set.

After mode switching is enabled, a negotiation containing connection setup for multimedia communications complying with H.324 equivalent is made, and a connection for a voice, moving image, still image, data communications, or the like is set, thus starting multimedia communications. In this case, a connection for a voice may be established prior to other kinds of information to quickly start voice communications, and after that, connections for other kinds of information may be established.

Also, voice communications according to the voice encoding scheme for the voice mode may be restored upon the multimedia communications. In such case, a negotiation for mode switching need only be made using a control channel for establishing a connection for multimedia communications.

In the sequence on the terminating terminal side, video/voice communications are made by the terminal main body, and voice communications are made by the handset. However, naturally voice communications by the terminal main body can also be made. In such case, the user operates the terminal main body to inform the handset of a terminal switching request, and upon recognition of that request, the handset informs the terminal main body of a terminal switching response and ends voice communications. Upon recognition of the terminal switching response, the terminal main body enables voice communications by itself. In this case, the terminals may be switched by operating on the handset side. Also, voice communications at the terminal main body are not limited to voice conversations using the earphone/microphone, but may be the ones by means of a voice via a loudspeaker.

When the terminal main body of the terminating terminal goes on-hook, a negotiation for ending multimedia communications is started. Upon completion of the negotiation, a disconnection message, release message, release message, and the like are exchanged between the originating and terminating terminals, thus disconnecting the line. Note that on-hook operation may be performed at the handset or the originating terminal.

When it is determined in the call setup message that a multimedia communication is to be performed, even when a response is made via voice communications at the handset, a negotiation for multimedia communications complying with H.324 equivalent may be started to establish a connection for voice communications prior to other kinds of information, thus quickly starting voice communications.

This sequence relates to the terminating terminal which is separated into the terminal main body and handset. However, the arrangement of the terminating terminal is not limited to such specific one. For example, the terminating terminal may be an integrated arrangement or may be separated into three or more portions.

FIGS. 13 to 17 show other sequence examples. The sequences shown in FIGS. 13 to 17 have different orders and contents of messages exchanged between the originating and terminating terminals from the sequence shown in FIG. 12, and the features of the individual sequences will be briefly explained below.

Figure 13:
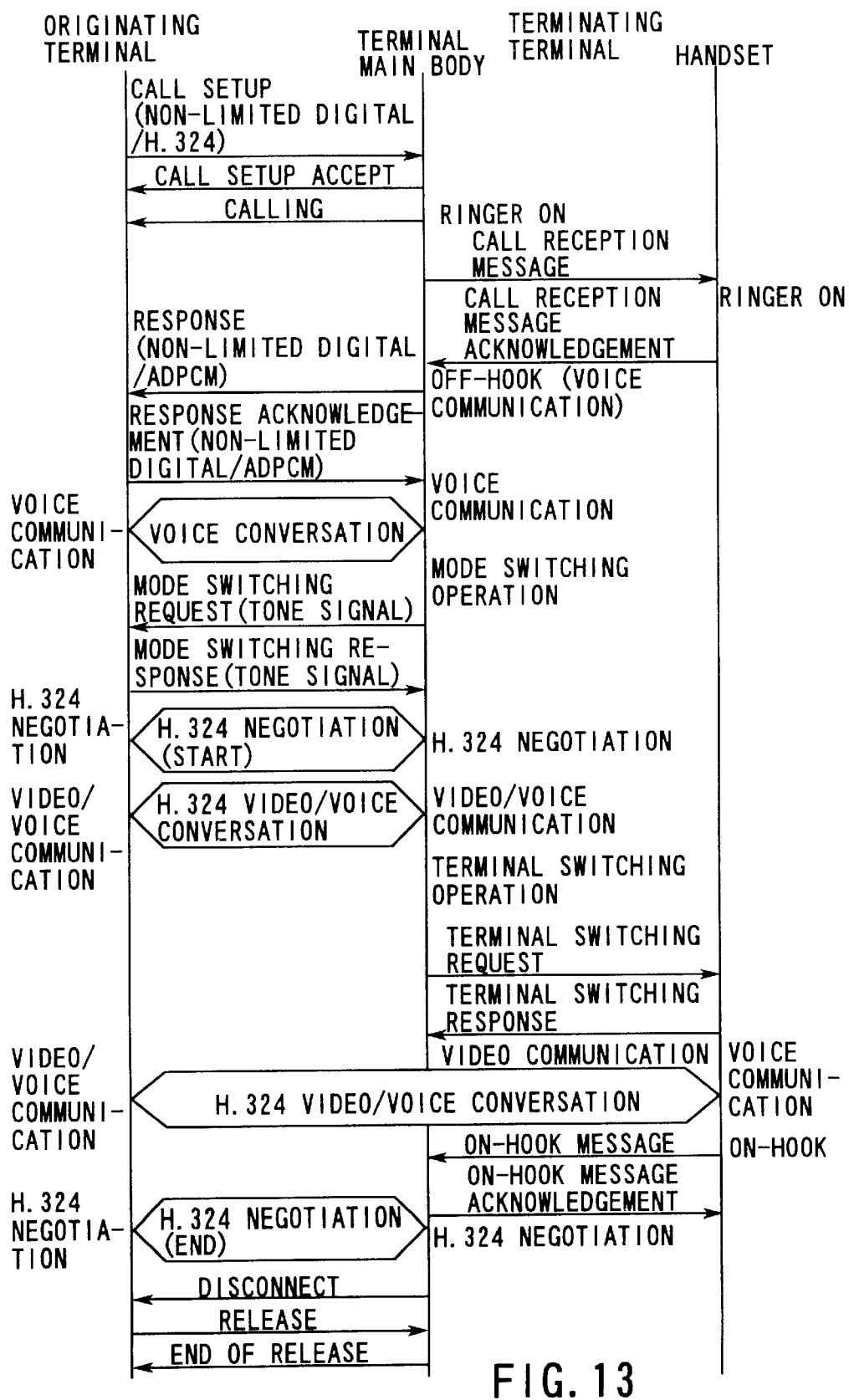
FIG. 13 is a chart showing an example of a switching control sequence upon reception of an incoming call.

In the sequence shown in FIG. 13, the user goes off-hook at the terminal main body. The sequence after the user goes off-hook is substantially the same as that in FIG. 12.

Figure 14:
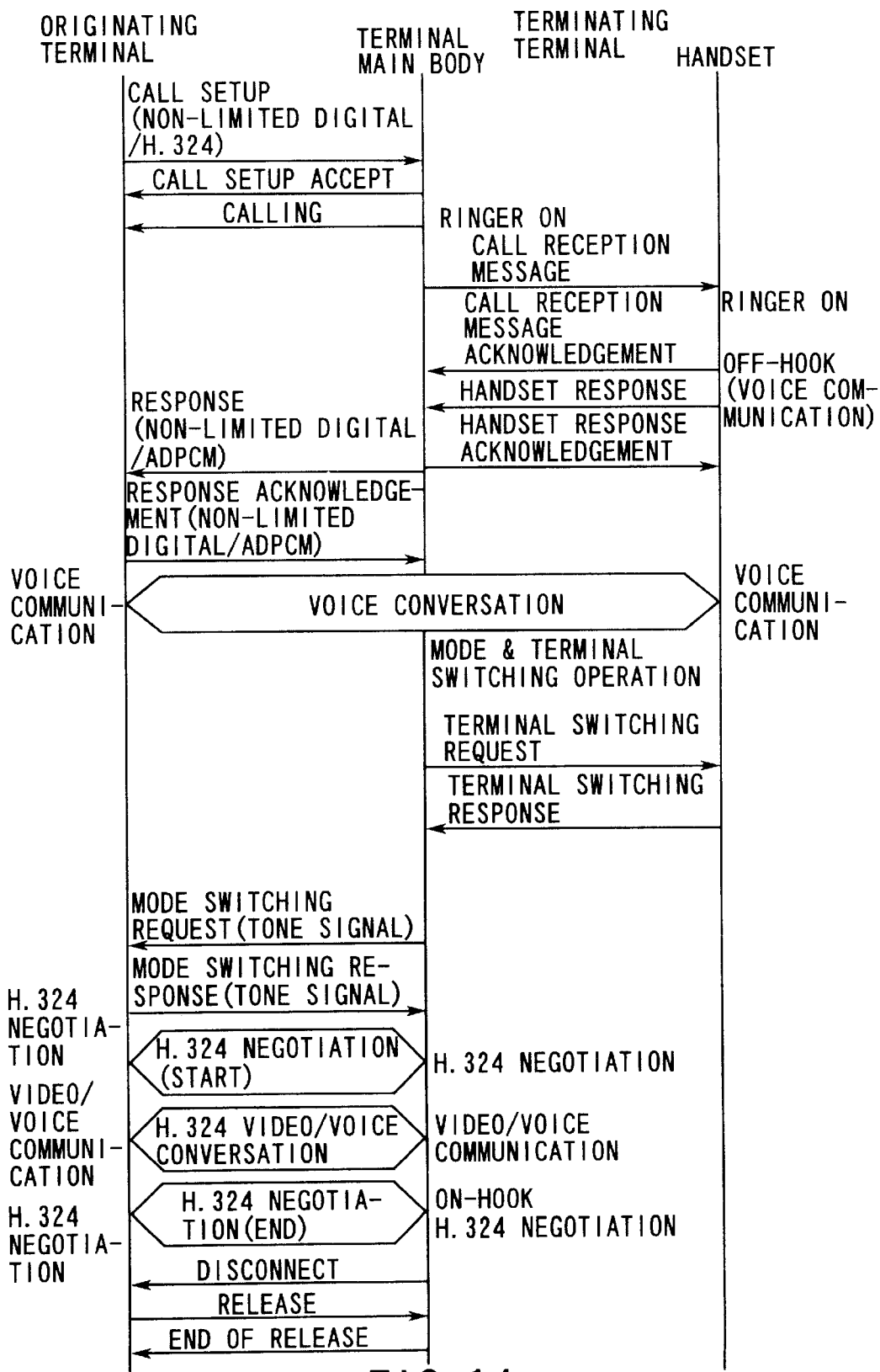
FIG. 14 is a chart showing an example of a switching control sequence upon reception of an incoming call.

In the sequence shown in FIG. 14, the user goes off-hook at the handset, and mode switching from voice communications to H.324 video/voice communications and terminal switching from the handset to the terminal main body are simultaneously done.

Figure 15:
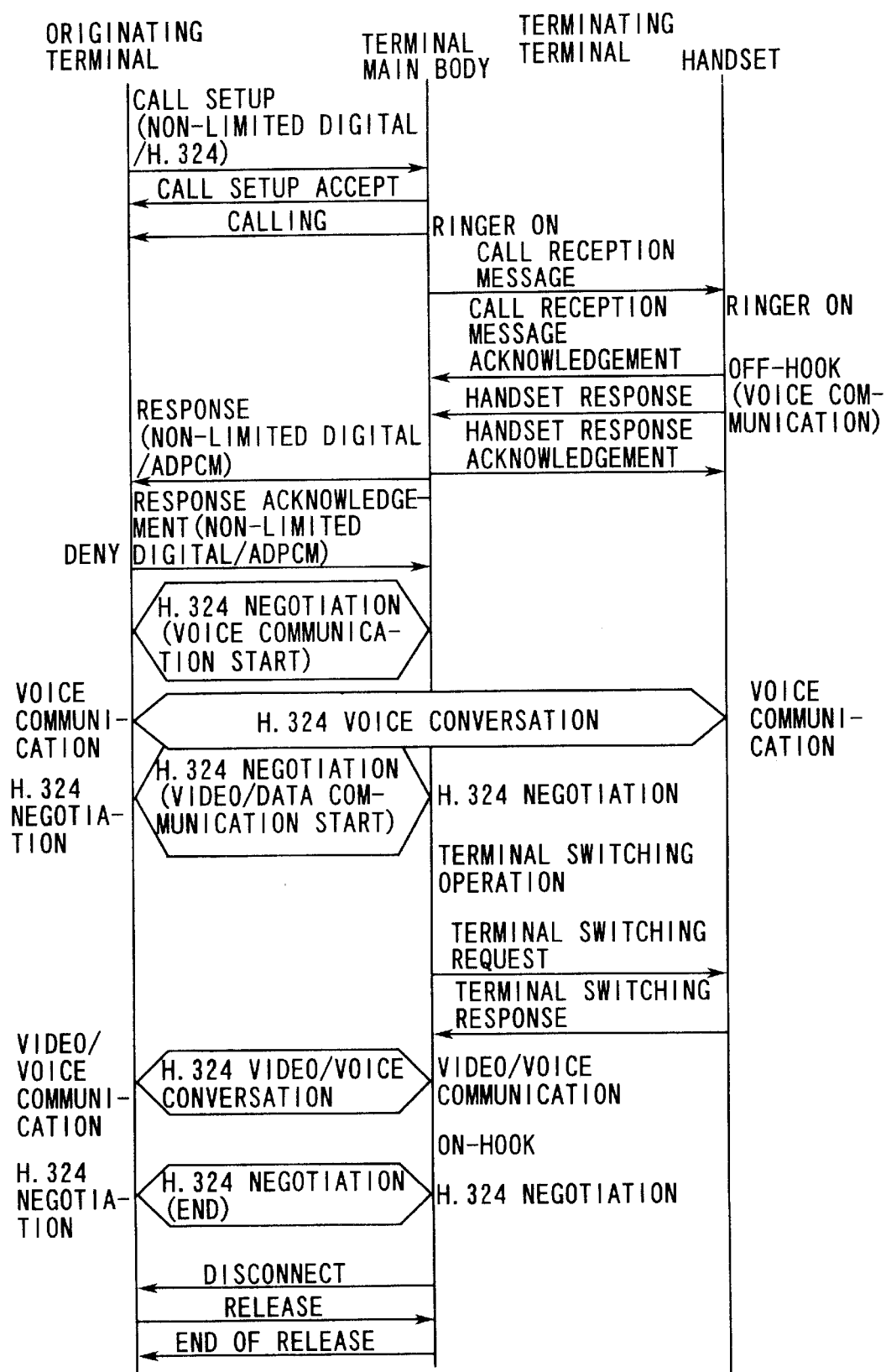
FIG. 15 is a chart showing an example of a switching control sequence upon reception of an incoming call.

The sequence shown in FIG. 15 is executed when the terminal main body of the called party issues a response indicating the voice encoding scheme (ADPCM) for the voice mode in the non-limited digital communication mode to the originating terminal, and the originating terminal denies it. In this case, a non-limited digital H.324 voice communication is set in a response acknowledgement message to be issued from the originating terminal to the terminating terminal.

Figure 16:
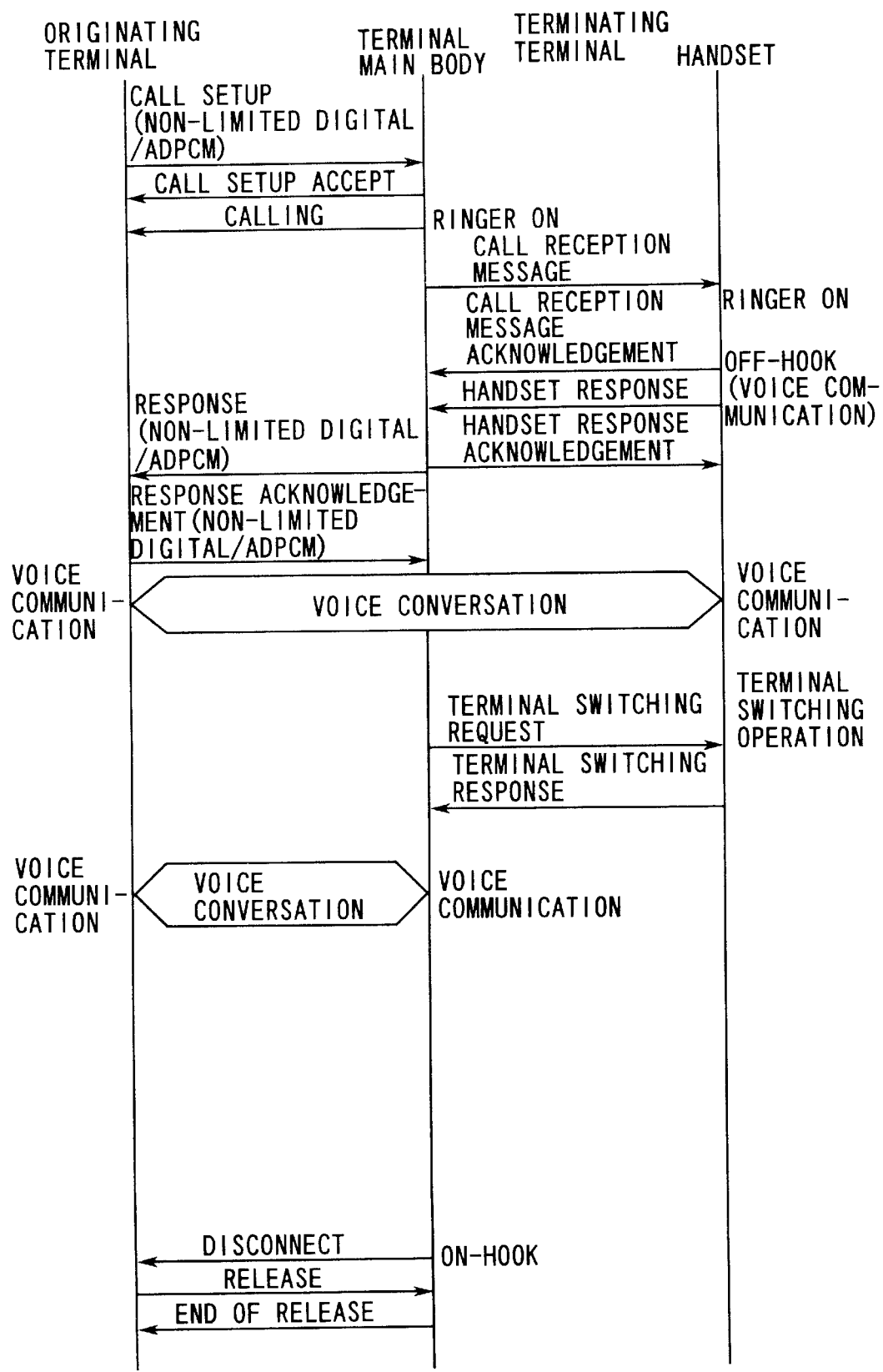
FIG. 16 is a chart showing an example of a switching control sequence upon reception of an incoming call.

In the sequence shown in FIG. 16, the originating terminal places a call while setting an ADPCM voice communication in a call setup message, and the user goes off-hook at the handset in response to that call. In this sequence, no video/voice communications complying with H.324 are made unlike the sequences described above.

Figure 17:
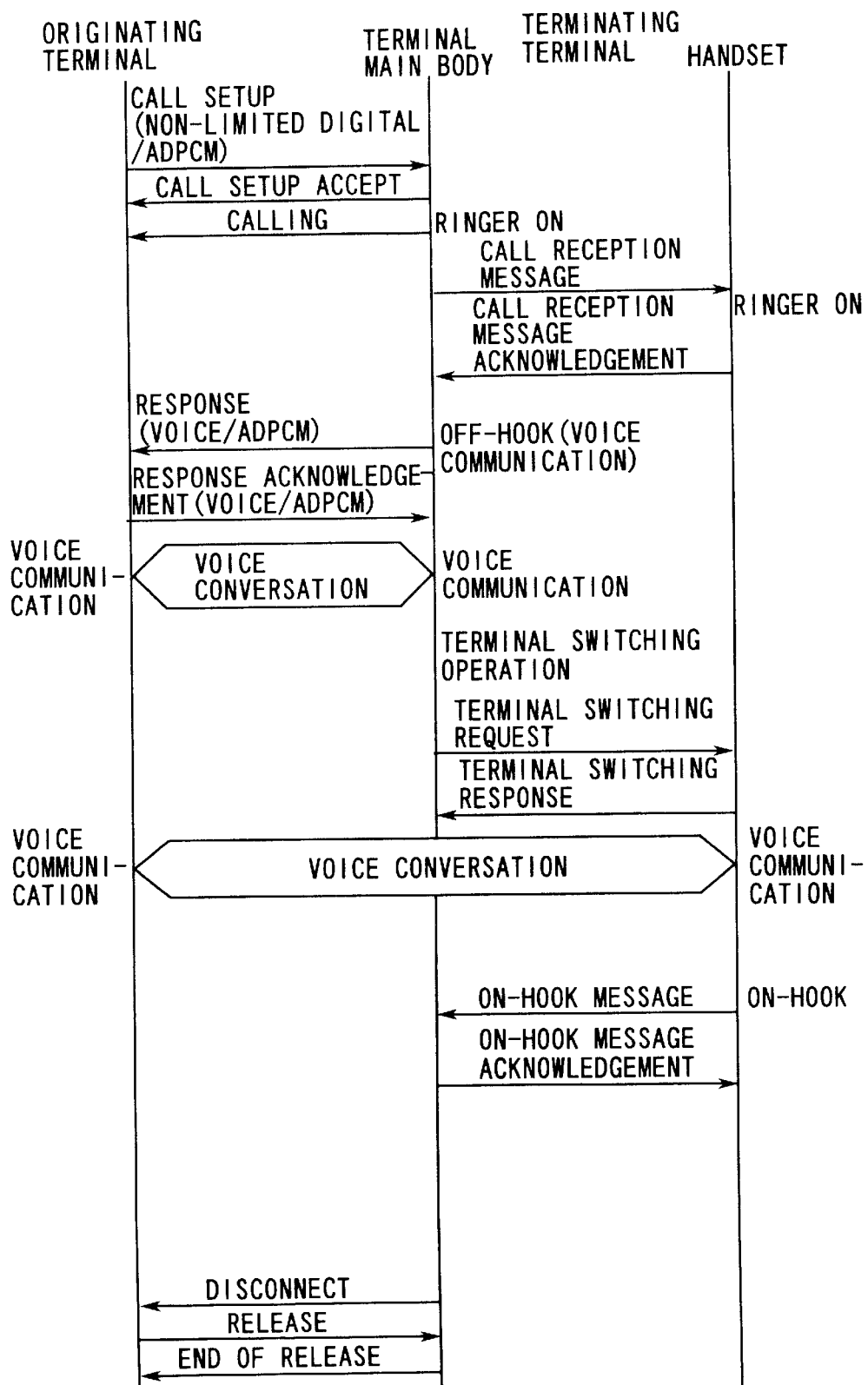
FIG. 17 is a chart showing an example of a switching control sequence upon reception of an incoming call.

The sequence shown in FIG. 17 is substantially the same as that shown in FIG. 16, except that the user goes off-hook at the terminal main body in place of the handset, and after voice communications at the terminal main body, terminal switching from the terminal main body to the handset is done.

Another hardware arrangement of this embodiment will be explained below.

Figure 18:
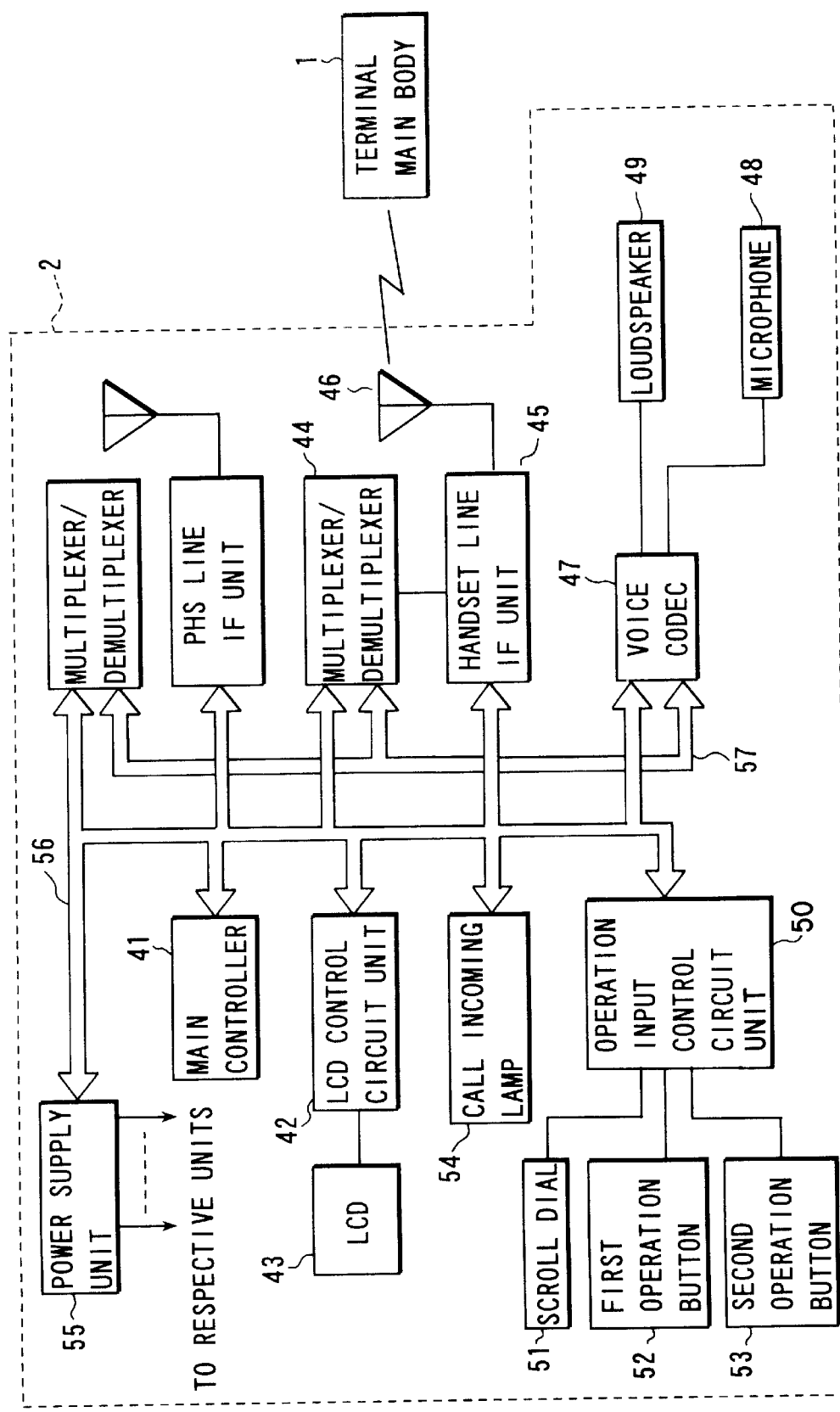
FIG. 18 is a block diagram showing the arrangement of a voice communication terminal according to another example of the arrangement of the communication terminal system.
Figure 19:
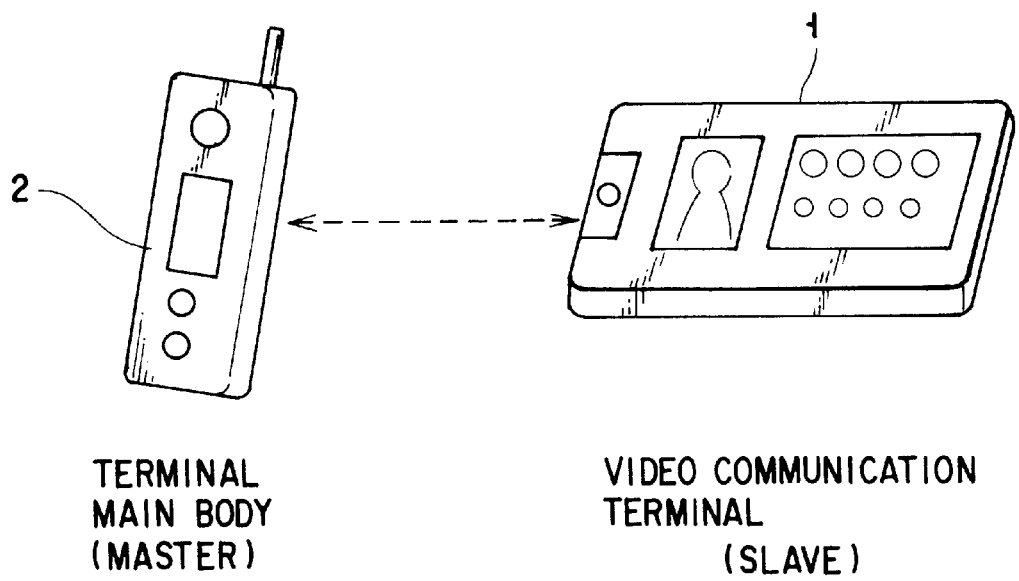
FIG. 19 is a view showing the outer appearance of the communication terminal system.
Figure 20:
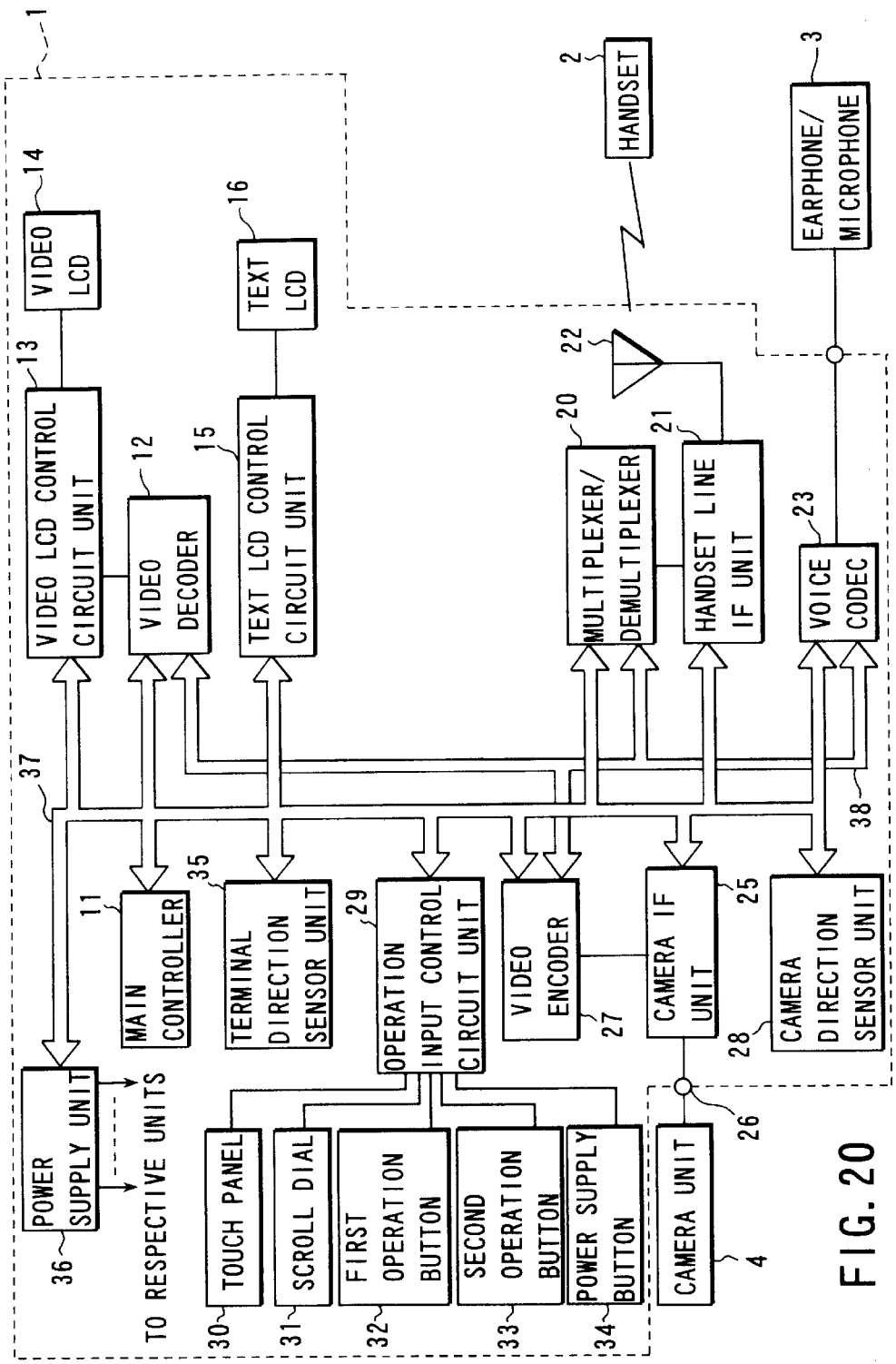
FIG. 20 is a block diagram showing the arrangement of a video/voice communication terminal according to another example of the arrangement of the communication terminal system.

FIGS. 18 and 20 are block diagrams showing another hardware arrangement, and FIG. 19 is a view showing the outer appearance thereof.

In the arrangement shown in FIGS. 1 to 4, the terminal main body 1 is a "master", and the handset 2 is a "slave". On the other hand, the arrangement shown in FIGS. 18 to 20 is characterized in that the handset 2 (to be referred to as a "voice communication terminal" hereinafter) is a "master", and the terminal main body 1 (to be referred to as a "video/voice communication terminal" hereinafter) is a "slave.

FIG. 18 shows the hardware arrangement of the voice communication terminal, which additionally comprises a PHS line I/F, antenna connected thereto, and multiplexer/demultiplexer, which are arranged in the terminal main body 1 shown in FIG. 1. On the other hand, FIG. 20 shows the hardware arrangement of the video/voice communication terminal, which does not comprise any PHS line I/F, antenna connected thereto, and multiplexer/demultiplexer.

Figure 21:
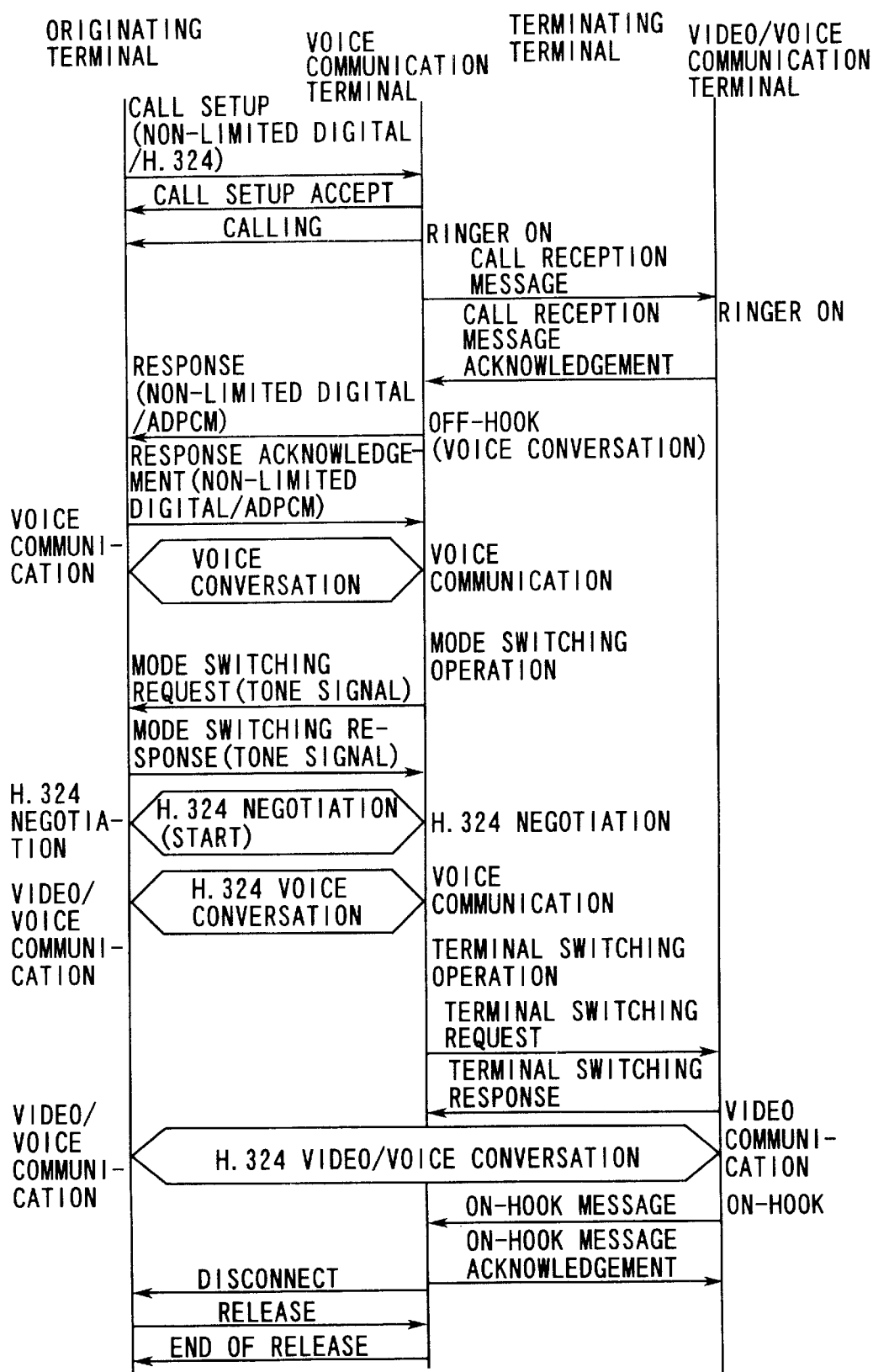
FIG. 21 is a chart showing an example of a switching control sequence upon reception of an incoming call.
Figure 22:
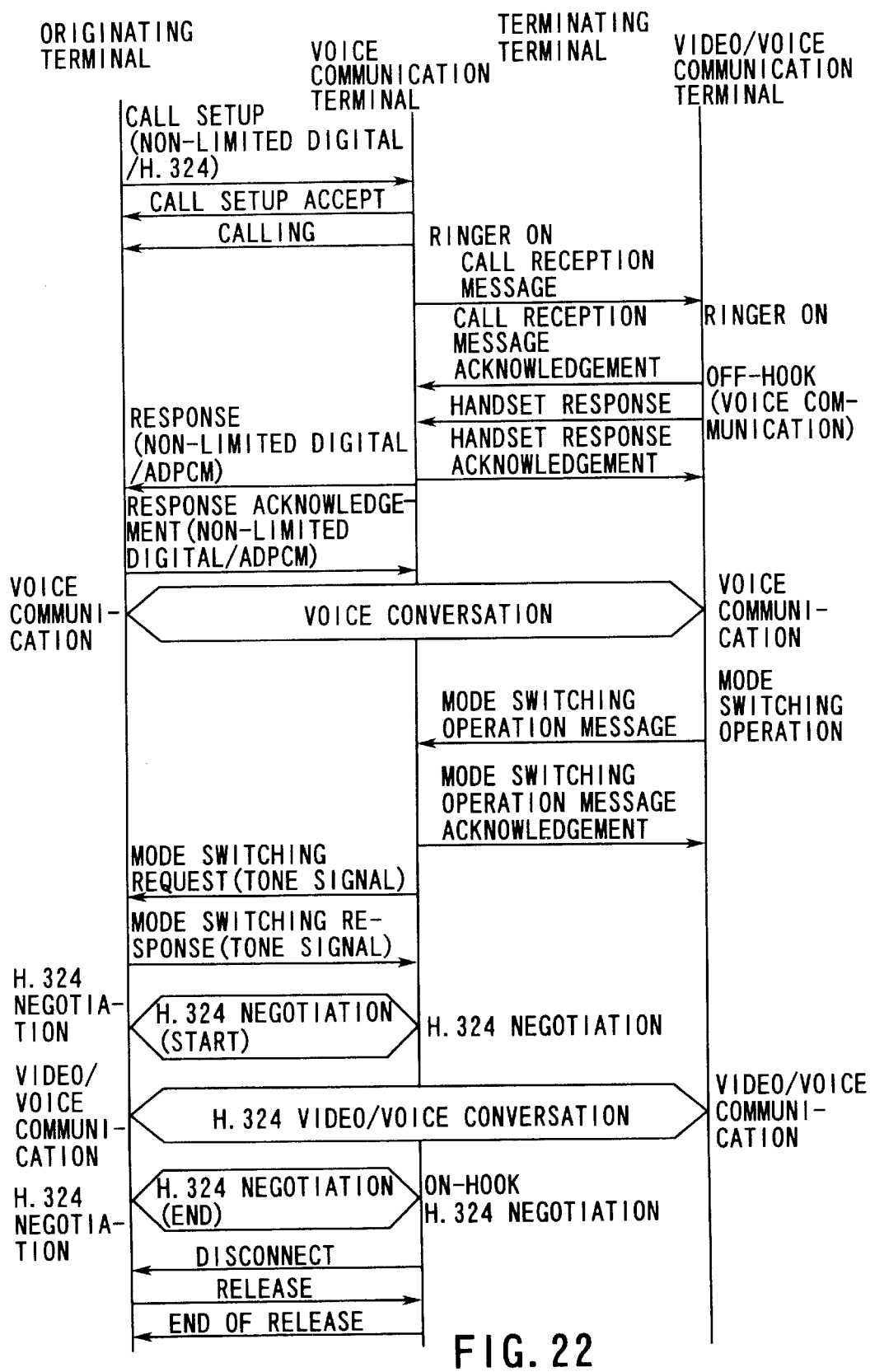
FIG. 22 is a chart showing an example of a switching control sequence upon reception of an incoming call.
Figure 23:
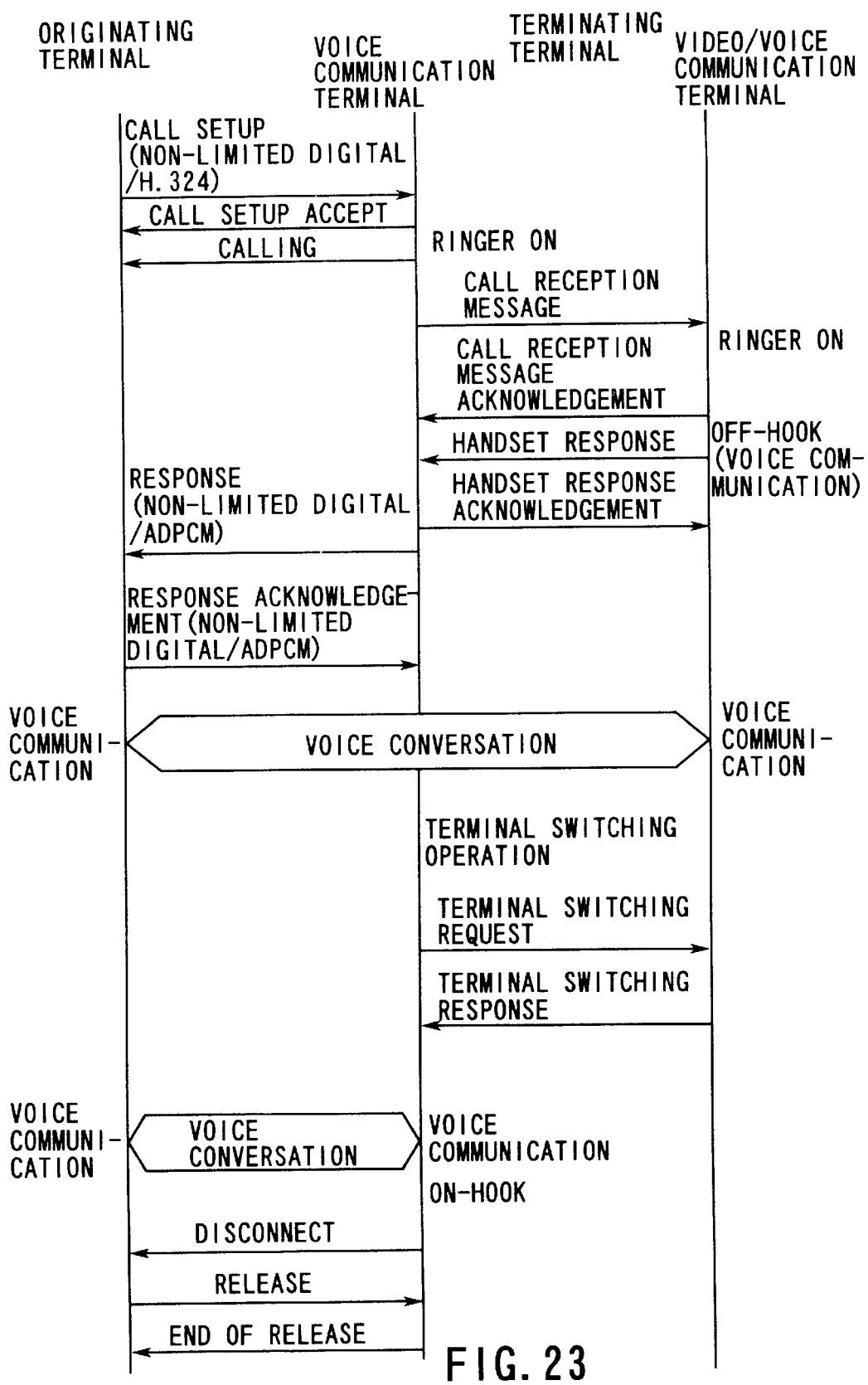
FIG. 23 is a chart showing an example of a switching control sequence upon reception of an incoming call.

FIGS. 21 to 23 are charts showing the sequences executed by the other hardware arrangement.

In the sequence shown in FIG. 21, the user goes off-hook and makes voice conversations at the voice communication terminal. After that, the user switches the mode at the voice communication terminal, and a mode switching request using a tone signal is transmitted to an originating terminal. In response to this request, voice communications complying with H.324 are made after a negotiation based on H.324 described above. Then, terminal switching is done, and the user makes video/voice communications complying with H.324 at the video/voice communication terminal. Note that communication data to be sent from the originating terminal in H.324 voice communications at the voice communication terminal contain not only voice but also video data.

In the sequence shown in FIG. 22, the user goes off-hook at the video/voice communication terminal in place of the voice communication terminal, and makes non-limited digital voice communications (ADPCM). After that, mode switching operation is transmitted to the originating terminal via the voice communication terminal. After an H.324 negotiation, video/voice communications complying with H.324 are made at the video/voice communication terminal.

In the sequence shown in FIG. 23, the user goes off-hook at the video/voice communication terminal, and makes non-limited digital voice communications (ADPCM). After that, terminal switching is done, and similar voice communications are made at the voice communication terminal.

According to the second embodiment mentioned above, switching control such as mode switching, terminal switching at the call reception side, and the like are appropriately done in accordance with the above-mentioned sequences upon reception of an incoming call. In this way, a high-performance communication terminal system with high portability and operability can be provided.

Third Embodiment

The third embodiment relates to a communication terminal apparatus which attains matching of video display directions. The hardware arrangement of this embodiment is the same as that of the first embodiment described above, and a detailed description thereof will be omitted.

In a portable communication terminal apparatus, the terminal holding direction by the user is uncertain at both the video transmitter and receiver sides. For this reason, when the holding directions of the transmitter/receiver sides do not agree with each other, images displayed on their terminals may be horizontally or vertically inverted. For this reason, a conventional portable communication terminal apparatus requires the terminal holding directions of the transmitter and receiver sides agree with each other.

Hence, the communication terminal apparatus of this embodiment comprises means for detecting the holding state of the terminal, exchanging each others' detected holding states between the two terminals, and processing a display image to match the video display directions when it is determined based on the comparison result of the exchanged holding state information that two terminal directions conflict with each other.

Video display direction matching control corresponding to the holding states of the partner terminal and the own terminal will be described in detail below.

The terminal main body 1 can be used not only in the state shown in FIG. 3 (to be referred to as a landscape state hereinafter) but also in a state rotated 90° from the state shown in FIG. 3 (to be referred to as a portrait state hereinafter). When the terminal main body 1 is in the landscape state, the display surface of the video LCD 14 and the video sensed by the camera unit 4 are both in the landscape state. On the other hand, when the terminal main body 1 is in the portrait state, the display surface of the video LCD 14 and the video sensed by the camera unit 4 are both in the portrait state. Whether the terminal main body 1 is in the landscape or portrait state is detected by the terminal direction sensor unit 35.

The terminal direction sensor unit 35 has two mercury relays set at the right and left lower end portions of the terminal main body 1. Each of these mercury relays is formed by sealing a small amount of mercury in a thin tube, and placing a pair of contacts at one end in the tube. When the mercury moves to the contact side by gravity, it short-circuits the contacts, thus electrically connecting the two contacts. That is, by monitoring the ON-OFF states of the two mercury relays, the holding direction of the terminal main body 1 can be determined.

In an initial negotiation, the main controller 11 informs the partner terminal of the direction of the terminal main body 1. Also, when the terminal direction sensor unit 35 detects that the direction of the terminal main body has changed during communications, the main controller 11 multiplexes information indicating that on transmission data as other data, and informs the partner terminal of it.

The partner terminal is also comprised of the same apparatus, and upon reception of the direction of the partner terminal, the main controller 11 compares information indicating the direction of the partner terminal (to be referred to as a remote terminal hereinafter) and information indicating the direction of the own terminal (to be referred to as a local terminal hereinafter), and processes a display image on the video LCD 14 as follows in correspondence with the comparison result.

When Local Terminal is in Landscape State

Figure 24:
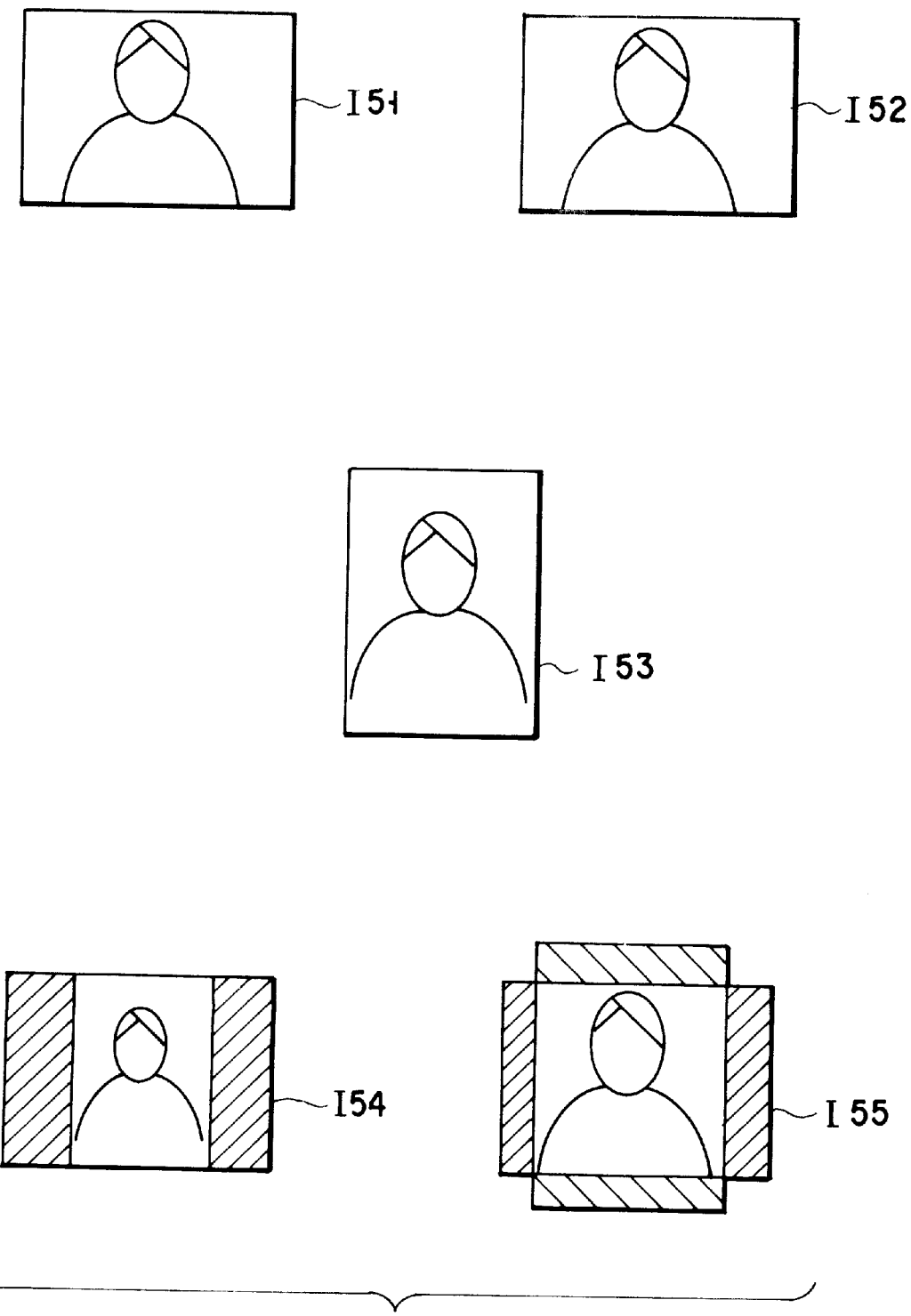
FIG. 24 is a view for explaining direction matching of videos according to the third embodiment of the present invention.

When the remote terminal is also in the landscape state, and a video in the state indicated by I51 in FIG. 24 is received, the main controller 11 controls the video LCD control circuit unit 13 to directly display the received video on the video LCD 14, as indicated by I52 in FIG. 24.

By contrast, when the remote terminal is in the portrait state, and a video in the state indicated by I53 in FIG. 24 is received, the main controller 11 uses one of two display methods, i.e., "reduced-size display" and "equal-size display" as follows in correspondence with the user's selection (acceptance of selection will be explained later).

I51 and I53 have different screen directions to show images, but their video data are generated by raster scan in the same direction (for example, in case of I51, a direction from the left to the right; in case of I53, a direction from the top to the bottom). For this reason, in order to display a video in the state indicated by I53 on the landscape screen, it must be rotated 90°. Hence, the main controller 11 performs 90° rotation in either the display method "reduced-size display" or "equal-size display".

When "reduced-size display" is selected, the main controller 11 controls the video LCD control circuit unit 13 to reduce the entire region of the received video to a size that can be displayed on the landscape screen, and to display the reduced video as that in the state indicated by 154 on the video LCD 14.

On the other hand, when "equal-size display" is selected, the main controller 11 controls the video LCD control circuit unit 13 to extract a portion (a central portion in a standard state) of a size that can be displayed on the landscape screen from the received video, and to display the extracted video as that in the state indicated by 155 on the video LCD 14.

When Local Terminal is in Portrait State

Figure 25:
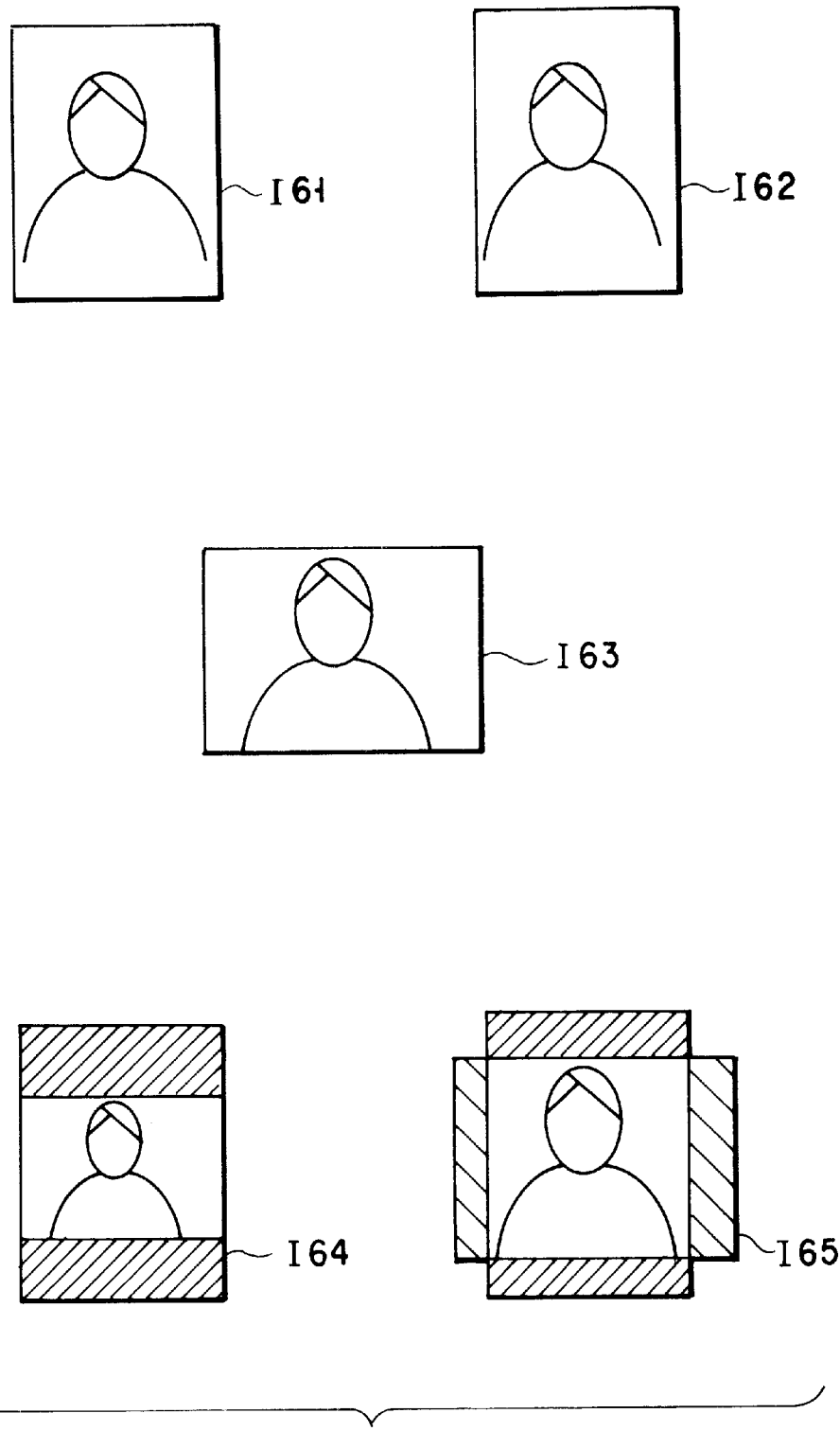
FIG. 25 is a view for explaining direction matching of videos according to the third embodiment of the present invention.

When the remote terminal is also in the portrait state, and a video in the state indicated by 161 in FIG. 25 is received, the main controller 11 controls the video LCD control circuit unit 13 to directly display the received video on the video LCD 14 in the state indicated by 163 in FIG. 25.

By contrast, when the remote terminal is in the landscape state, and a video in the state indicated by 163 in FIG. 25 is received, the main controller 11 uses one of two display methods, i.e., "reduced-size display" and "equal-size display" as follows in correspondence with the user's selection (accept of selection will be explained later).

In FIG. 25, 161 and 163 have different screen directions to show images, but their video data are generated by raster scan in the same direction (for example, in case of 161, a direction from the top to the bottom; in case of 163, a direction from the left to the right). For this reason, in order to display a video in the state indicated by 163 on the portrait screen, it must be rotated 90°. Hence, the main controller 11 performs 90° rotation in either the display method "reduced-size display" or "equal-size display".

When "reduced-size display" is selected, the main controller 11 controls the video LCD control circuit unit 13 to reduce the entire region of the received video to a size that can be displayed on the portrait screen, and to display the reduced video as that in the state indicated by 164 on the video LCD 14.

On the other hand, when "equal-size display" is selected, the main controller 11 controls the video LCD control circuit unit 13 to extract a portion (a central portion in a standard state) of a size that can be displayed on the portrait screen from the received video, and to display the extracted video as that in the state indicated by 165 on the video LCD 14.

In this fashion, by processing a video, appropriate display can be made independently of the landscape or portrait state of the local terminal.

Upon processing a video, an image must be processed in consideration of not only the aspect ratio of the image but also "erection" of the image.

On the other hand, only one terminal holding state may be variable in some cases. In such case, as described above, a video may be processed not by the receiving terminal but by a transmitting terminal. The holding state of the receiving terminal is transmitted to the transmitting terminal, and the transmitting terminal processes a video to be processed on the basis of the holding state of the receiving terminal and then transmits the processed video to the receiving terminal.

To restate, according to the third embodiment, since the holding state of the terminal is detected, the two terminals exchange each others' detected holding states, and a display image is processed to match the video display directions when it is determined based on the comparison result of the exchanged holding state information that two terminal directions conflict with each other, even when the terminal holding directions by the users do not agree with each other at the transmitter/receiver sides, images displayed on the two terminals can be prevented from being horizontally or vertically inverted.

The above explanation has been given under the condition that the holding states of the two terminals are uncertain. However, the present invention is not limited to such specific condition. For example, when the holding state of one terminal is fixed and that of the other terminal is uncertain, and the holding states conflict with each other between the terminal with an indefinite holding state and that with the fixed holding state, display images may be processed to match the video display directions. In the above description, only a video (moving image) has been explained. However, a video is not limited to a moving image but may be a still image. In addition, in place of processing a display image, the display device or camera may have a rotatable arrangement, and when conflict of the holding state has occurred, the display screen of the display device may be mechanically rotated to remove such conflict.

In the above description, the holding state of the terminal is detected using mercury switches. However, the present invention is not limited to such specific switches. For example, a holding direction indication means comprised of, e.g., a specific operation button, touch panel, or the like for detecting some operation at the terminal may be added, and the terminal holding direction may be detected upon operation of this means by the user.

In addition, appropriate modifications may be made without departing from the scope of the present invention.

INDUSTRIAL APPLICABILITY

According to the present invention, a communication terminal apparatus which is very easy to operate even when it is operated while being held with a hand, can be satisfactorily used in various situations, and has high portability and storability, can be provided.

What is claimed is:

1. A communication terminal comprising:
   a first communication unit which communicates with another communication terminal via a radio communication network and has a voice communication path and a multimedia communication path, enabling exchange of at least one of voice data, motion-picture data, and data of other kinds;
   a second communication unit which communicates with the first communication unit, and communicates with said another communication terminal through the first communication unit, thereby exchanging multimedia information including at least one of voice data, motion-picture data and data of other kinds; and
   switching means for, in response to a request from a user, switching over to one of first and second communication paths, the first communication path enabling communications between the first communication unit and said another communication terminal, thereby enabling exchange of the multimedia information including at least one of voice data, motion-picture data, and data of other kinds, and the second communication path enabling communications between the second communication unit and said another communication terminal, thereby enabling exchange of the multimedia information including at least one of voice data, motion-picture data, and data of other kinds,
   wherein said switching means is provided in said first communication unit, and said first communication unit includes transmission means for transmitting a switching request signal to the second communication unit; and reception means for receiving a response signal corresponding to the switching request signal.

2. A communication terminal comprising:
- a first communication unit which communicates with another communication terminal via a radio communication network and has a voice communication path and a multimedia communication path enabling exchange of at least one of voice data, motion-picture data, and data of other kinds;
- a second communication unit which communicates with the first communication unit, and communicates with said another communication terminal through the first communication unit, thereby exchanging multimedia information including at least one of voice data, motion-picture data and data of other kinds; and
- switching means for, in response to a request from a user, exchanging switching request and response signals between the first and second communication units, and for switching over to one of first and second communication paths for a continuation of communications with said another communication terminal in accordance with said signals, the first communication path enabling communications between the first communication unit and said another communication terminal, thereby enabling exchange of the multimedia information, and the second communication path enabling communications between the second communication unit and said another communication terminal, thereby enabling exchange of the multimedia information.

3. A communication terminal according to claim 2, wherein said switching means switches communication modes such that communications between the first communication unit and the another terminal are stopped and communications between the second communication unit and the another terminal are started.

4. A communication terminal according to claim 2, wherein said switching means switches communication modes such that communications between the second communication unit and the another terminal are stopped and communications between the first communication unit and the another terminal are started.

5. A communication terminal according to claim 2, wherein said first and second units are coupled together by radio.

6. A communication terminal according to claim 2, further comprising second switching means for switching over to one of said voice communication and the multimedia communication in response to a request from the user.

7. A communication terminal according to claim 2, further comprising means for determining whether a communication type requested by said another terminal is said voice communication or said multimedia communication, by using at least one of the following fields: transmission performance, subaddress, called number, calling number, and inter-user information message contained in a call control message pertaining to call control.

8. A communication terminal comprising:
- a first communication unit which communicates with another communication terminal via a radio communication network and has a voice communication path and a multimedia communication path, enabling exchange of at least one of voice data, motion-picture data, and data of other kinds;
- a second communication unit which communicates with the first communication unit, and communicates with said another communication terminal through the first communication unit, thereby exchanging multimedia information including at least one of voice data, motion-picture data and data of other kinds;
- switching means for, in response to a request from a user, switching over to one of first and second communication paths, the first communication path enabling communications between the first communication unit and said another communication terminal, thereby enabling exchange of the multimedia information including at least one of voice data, motion-picture data, and data of other kinds, and the second communication path enabling communications between the second communication unit and said another communication terminal, thereby enabling exchange of the multimedia information including at least one of voice data, motion-picture data, and data of other kinds; and
- means for commencing said voice communication prior to said multimedia communication in accordance with an off-hook operation by the user when a call setting for the multimedia communication is received from said another communication terminal.

9. A communication terminal according to claim 8, wherein said voice communication is a communication using a communication encoding scheme for a voice mode in a non-limited digital communication mode.

10. A communication terminal according to claim 8, further comprising means for commencing a voice communication in said multimedia communication prior to a video communication.

11. A communication terminal according to claim 8, further comprising communication mode switching means for switching said voice communication to said multimedia communication by use of a switching signal comprising a tone signal.

12. A communication terminal according to claim 11, wherein said switching signal is a signal indicating one of a combination of frequencies, a combination of phases, a modulated specific code, and repetition of the modulated specific code.

* * * * *